(12) United States Patent
Ding

(10) Patent No.: US 12,300,137 B2
(45) Date of Patent: May 13, 2025

(54) METHOD FOR DISPLAYING DYNAMIC WALLPAPER AND RELATED DEVICE

(71) Applicant: Honor Device Co., Ltd., Shenzhen (CN)

(72) Inventor: Yujiao Ding, Shenzhen (CN)

(73) Assignee: HONOR DEVICE CO., LTD., Shenzhen (CN)

( * ) Notice: Subject to any disclaimer, the term of this patent is extended or adjusted under 35 U.S.C. 154(b) by 0 days.

(21) Appl. No.: 18/265,355

(22) PCT Filed: Dec. 7, 2022

(86) PCT No.: PCT/CN2022/137240
§ 371 (c)(1),
(2) Date: Jun. 5, 2023

(87) PCT Pub. No.: WO2023/130881
PCT Pub. Date: Jul. 13, 2023

(65) Prior Publication Data
US 2024/0404441 A1  Dec. 5, 2024

(30) Foreign Application Priority Data
Jan. 5, 2022 (CN) .......................... 202210006247.9

(51) Int. Cl.
*G09G 3/00* (2006.01)

(52) U.S. Cl.
CPC ......... *G09G 3/035* (2020.08); *G09G 2354/00* (2013.01)

(58) Field of Classification Search
CPC .... G06F 1/1641; G06F 1/1618; G06F 1/1616; G06F 1/162; G06F 1/1647; G06F 1/1654;
(Continued)

(56) References Cited

U.S. PATENT DOCUMENTS 11,431,951 B2  8/2022  Li et al.
2014/0375702 A1*  12/2014  Cho .................... G06F 3/04886
345/102
(Continued)

FOREIGN PATENT DOCUMENTS

CN  109672776 A  4/2019
CN  110045936 A *  7/2019
(Continued)

OTHER PUBLICATIONS

CN-110045936-A (Year: 2017).*
(Continued)

*Primary Examiner* — Sanjiv D. Patel
(74) *Attorney, Agent, or Firm* — Slater Matsil, LLP

(57) ABSTRACT

A method includes: displaying a user interface on a first screen, displaying at least one frame of continuous image of the dynamic wallpaper on the first screen, switching to a second screen for displaying the user interface, and displaying at least one frame of continuous image of the dynamic wallpaper on the second screen. Because a first frame of image displayed on the second screen is a last frame of image displayed on the first screen or a frame after a last frame of image displayed on the first screen, the at least one frame of continuous image of the dynamic wallpaper displayed on the first screen is continuous with the at least one frame of continuous image of the dynamic wallpaper displayed on the second screen.

19 Claims, 20 Drawing Sheets

(58) Field of Classification Search
CPC .............. G06F 1/1622; G06F 3/1446; G06F 2200/1614; G09F 9/301; G09G 2380/02; G09G 2300/026; G09G 3/035; G09G 2354/00
See application file for complete search history.

(56) References Cited

U.S. PATENT DOCUMENTS

| | | |
|---|---|---|
| 2020/0225706 A1 | 7/2020 | Jung et al. |
| 2020/0264826 A1* | 8/2020 | Kwon ................... G06F 1/1677 |
| 2020/0333834 A1* | 10/2020 | Seo ........................ G09G 5/391 |
| 2021/0287593 A1 | 9/2021 | Baek et al. |
| 2022/0057866 A1 | 2/2022 | Xu |

FOREIGN PATENT DOCUMENTS

| | | |
|---|---|---|
| CN | 110908762 A | 3/2020 |
| CN | 110968229 A | 4/2020 |
| CN | 110990090 A | 4/2020 |
| EP | 3886415 A1 | 9/2021 |

OTHER PUBLICATIONS

Amaztech, "Huawei Mate X2 Live Demo—Animated Folding Live Wallpaper", Webpage, Retrieved from the internet, URL: https://www.youtube.com/watch?v=T_8Vth9ZhLY, Feb. 24, 2021, 2 Pages.

* cited by examiner (1)

(2)

(3)

(4)

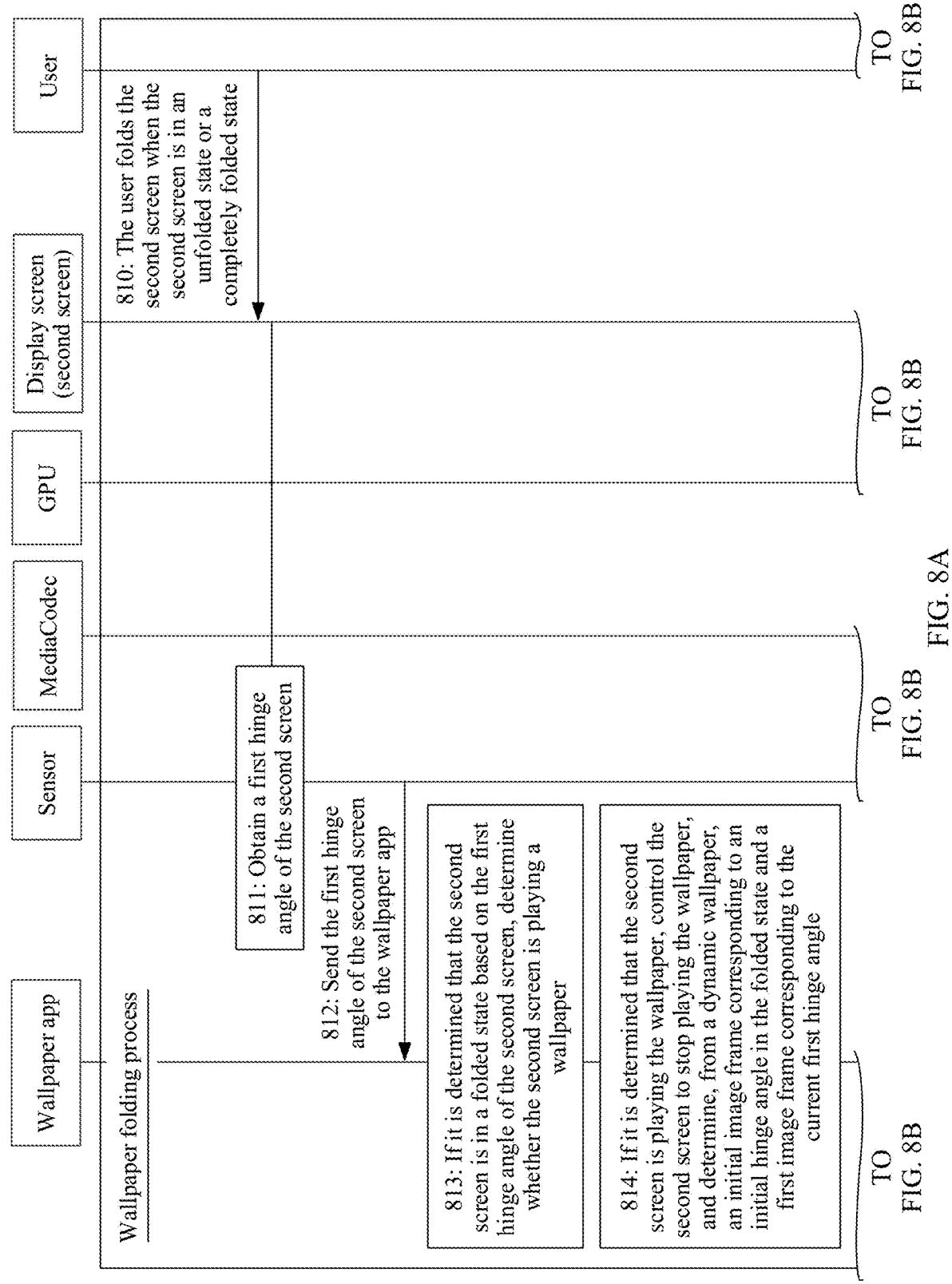

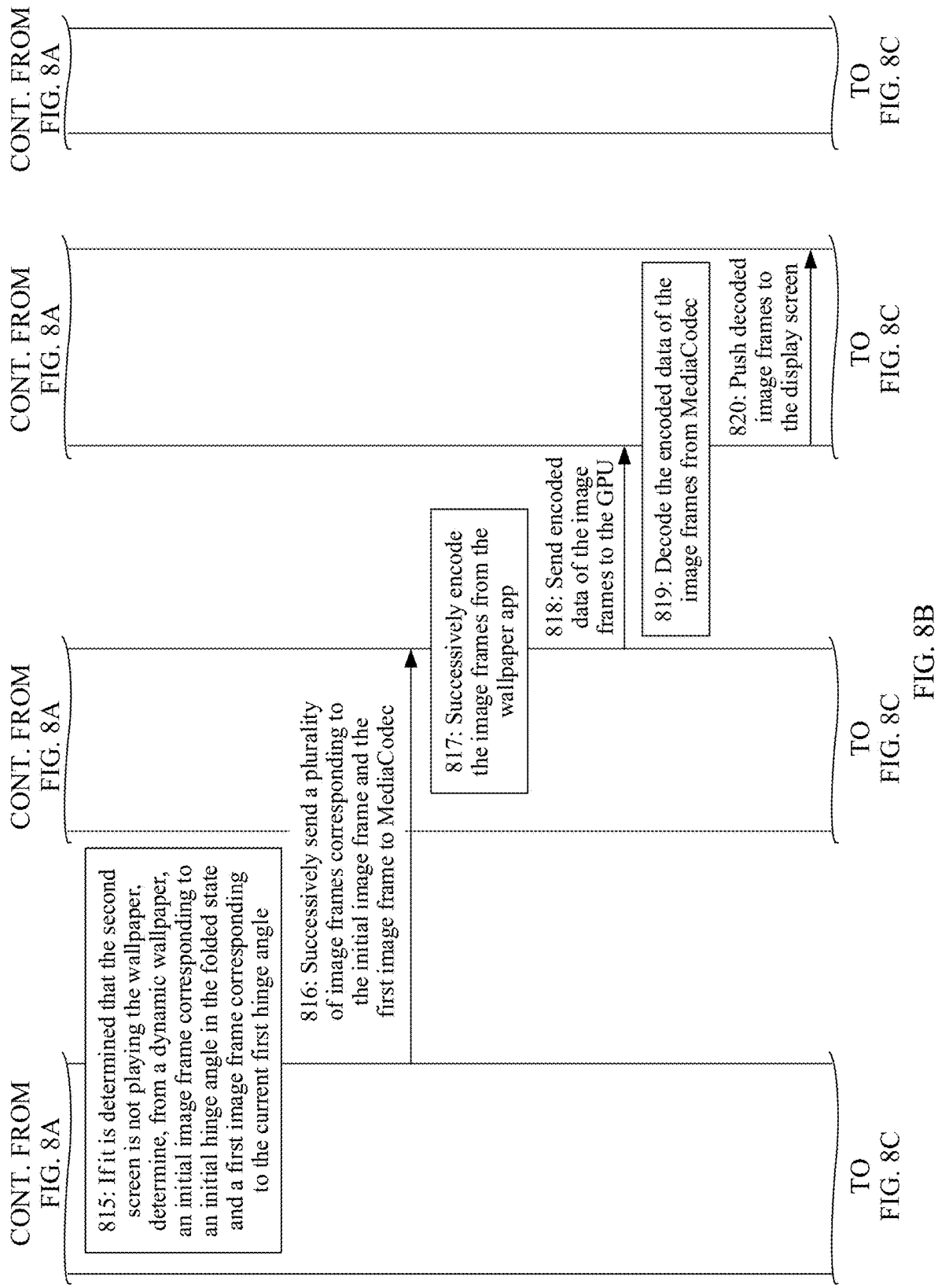

METHOD FOR DISPLAYING DYNAMIC WALLPAPER AND RELATED DEVICE

CROSS-REFERENCE TO RELATED APPLICATIONS

This application is a national stage of International Application No. PCT/CN2022/137240, filed on Dec. 7, 2022, which claims priority to Chinese Patent Application No. 202210006247.9, filed on Jan. 5, 2022. The disclosures of both of the aforementioned applications are hereby incorporated by reference in their entireties.

TECHNICAL FIELD

This application relates to the field of display technologies, and in particular, to a method for displaying a dynamic wallpaper and a related device.

BACKGROUND

As foldable screen technologies are increasingly mature, there is an increasing number of foldable phones on the market. To improve experience of users when using foldable phones, developers have developed dynamic wallpapers associated with foldable screen technologies, to improve experience of users when using the foldable phones. Specifically, the dynamic wallpaper presented by the foldable phone on a user interface can bring a dynamic effect to the user as a foldable screen is unfolded or folded, and provide the user with novel and interesting experience.

However, at present, the dynamic wallpaper used on the foldable phone can present only the dynamic effect on a big-screen home screen, and cannot show a continuous dynamic effect during unfolding from a small screen to a big screen, and cannot further bring use experience of smoothly switching between display screens to the user during unfolding of a display screen.

SUMMARY

This application provides a method for displaying a dynamic wallpaper and a related device, to resolve a problem that no continuous dynamic effect is presented during unfolding from a small screen to a big screen.

To achieve the foregoing purpose, this application provides the following technical solutions.

According to a first aspect, this application provides a method for displaying a dynamic wallpaper, and the method is applied to an electronic device. The electronic device includes a display screen with an adjustable display size, and the display screen with an adjustable display size is configured to display a user interface on a first screen or display a user interface on a second screen. A display size of the first screen is different from a display size of the second screen. The method for displaying a dynamic wallpaper includes: displaying the user interface on the first screen, and displaying at least one frame of continuous image of a dynamic wallpaper on the first screen; and switching to the second screen for displaying the user interface, and displaying at least one frame of continuous image of the dynamic wallpaper on the second screen. A first frame of image displayed on the second screen is a last frame of image displayed on the first screen or a frame after a last frame of image displayed on the first screen.

In an embodiment of this application, during switching from the first screen for displaying the user interface to the second screen for displaying the user interface, because the first frame of image displayed on the second screen is the last frame of image displayed on the first screen or the frame after the last frame of image displayed on the first screen, the at least one frame of continuous image displayed on the first screen is continuous with the at least one frame of continuous image displayed on the second screen. Therefore, a dynamic effect presented by the dynamic wallpaper is continuous during switching of screens for displaying the user interface.

In a possible implementation, the dynamic wallpaper includes: at least one frame of continuous image corresponding to a first home screen scenario and at least one frame of continuous image corresponding to a second home screen scenario. A first frame of image corresponding to the second home screen scenario is a frame after a last frame of image corresponding to the first home screen scenario. The displaying at least one frame of continuous image of the dynamic wallpaper on the first screen includes: displaying the at least one frame of continuous image corresponding to the first home screen scenario on the first screen in response to an operation of switching to a home screen scenario. The displaying at least one frame of continuous image of the dynamic wallpaper on the second screen includes: if all of the at least one frame of continuous image corresponding to the first home screen scenario are displayed on the first screen, displaying the at least one frame of continuous image corresponding to the second home screen scenario on the second screen; or if all of the at least one frame of continuous image corresponding to the first home screen scenario are not displayed on the first screen, successively displaying, on the second screen, an image that is corresponding to the first home screen scenario and that is not displayed on the first screen, and the at least one frame of continuous image corresponding to the second home screen scenario.

In another possible implementation, the dynamic wallpaper further includes: at least one frame of continuous image corresponding to an AOD screen-off scenario and at least one frame of continuous image corresponding to a lock screen scenario. A first frame of image corresponding to the lock screen scenario is a frame after a last frame of image corresponding to the AOD screen-off scenario.

Before the displaying the at least one frame of continuous image corresponding to the first home screen scenario on the first screen in response to an operation of switching to a home screen scenario, the method further includes: successively displaying the at least one frame of continuous image corresponding to the AOD screen-off scenario and the at least one frame of continuous image corresponding to the lock screen scenario on the first screen in response to an operation of switching to the lock screen scenario.

In another possible implementation, the display screen with an adjustable display size is a foldable screen, and the second screen includes two display screens. The first screen includes one display screen. A display progress of the at least one frame of continuous image of the dynamic wallpaper on the second screen is positively related to a value of a hinge angle. The hinge angle is an included angle between the two display screens included in the second screen.

In another possible implementation, the display screen with an adjustable display size is a foldable screen, and the second screen includes two display screens. The first screen includes one display screen. A display progress of the at least one frame of continuous image of the dynamic wallpaper on the second screen is positively related to a value of a hinge angle. The hinge angle is an included angle between planes in which the two display screens included in the second screen are respectively located.

After the displaying at least one frame of continuous image of the dynamic wallpaper on the second screen, the method may further include: if it is detected that the hinge angle is reduced, displaying the at least one frame of continuous image corresponding to the second home screen scenario on the second screen based on the hinge angle in a reverse sequence of an image arrangement sequence, until the first screen is switched to for displaying the user interface, and then displaying the last frame of image corresponding to the first home screen scenario on the first screen.

In this embodiment, the hinge angle of the second screen is reduced, that is, while a user is folding the second screen, the at least one frame of continuous image corresponding to the second home screen scenario is displayed on the second screen based on the hinge angle in the reverse sequence of the image arrangement sequence, so that images are displayed continuously, and the first screen is switched to for displaying the user interface. Then, the last frame of image corresponding to the first home screen scenario is displayed on the first screen. The last frame of image corresponding to the first home screen scenario is continuous with a last frame of image displayed on the second screen. This enables a dynamic effect presented by the dynamic wallpaper during folding to be still continuous.

In another possible implementation, the dynamic wallpaper includes: at least one frame of continuous image corresponding to an AOD screen-off scenario, at least one frame of continuous image corresponding to a lock screen scenario, at least one frame of continuous image corresponding to a first home screen scenario, and at least one frame of continuous image corresponding to a second home screen scenario. A first frame of image corresponding to the lock screen scenario is a frame after a last frame of image corresponding to the AOD screen-off scenario. A first frame of image corresponding to the first home screen scenario is a frame after a last frame of image corresponding to the lock screen scenario. A first frame of image corresponding to the second home screen scenario is a frame after a last frame of image corresponding to the first home screen scenario.

The displaying at least one frame of continuous image of the dynamic wallpaper on the first screen includes: successively displaying the at least one frame of continuous image corresponding to the AOD screen-off scenario and the at least one frame of continuous image corresponding to the lock screen scenario on the first screen in response to an operation of switching to the lock screen scenario. The displaying at least one frame of continuous image of the dynamic wallpaper on the second screen includes: displaying a last frame of image corresponding to the lock screen scenario on the second screen.

In another possible implementation, after the displaying a last frame of image corresponding to the lock screen scenario on the second screen, the method further includes: successively displaying the at least one frame of continuous image corresponding to the first home screen scenario and the at least one frame of continuous image corresponding to the second home screen scenario on the second screen in response to an operation of switching to a home screen scenario.

In another possible implementation, the dynamic wallpaper includes: at least one frame of continuous image corresponding to an AOD screen-off scenario and at least one frame of continuous image corresponding to a lock screen scenario. A first frame of image corresponding to the lock screen scenario is a frame after a last frame of image corresponding to the AOD screen-off scenario. The displaying at least one frame of continuous image of the dynamic wallpaper on the second screen includes: displaying, on the second screen, an AOD screen-off interface that does not include an image of the dynamic wallpaper, and then successively displaying the at least one frame of continuous image corresponding to the AOD screen-off scenario and the at least one frame of continuous image corresponding to the lock screen scenario on the second screen in response to an operation of switching to the lock screen scenario.

In another possible implementation, the dynamic wallpaper further includes: at least one frame of continuous image corresponding to a first home screen scenario and at least one frame of continuous image corresponding to a second home screen scenario. A first frame of image corresponding to the first home screen scenario is a frame after a last frame of image corresponding to the lock screen scenario. A first frame of image corresponding to the second home screen scenario is a frame after a last frame of image corresponding to the first home screen scenario.

After the successively displaying the at least one frame of continuous image corresponding to the AOD screen-off scenario and the at least one frame of continuous image corresponding to the lock screen scenario on the second screen in response to an operation of switching to the lock screen scenario, the method further includes: successively displaying the at least one frame of continuous image corresponding to the first home screen scenario and the at least one frame of continuous image corresponding to the second home screen scenario on the second screen in response to an operation of switching to a home screen scenario.

In another possible implementation, the displaying the at least one frame of continuous image corresponding to the first home screen scenario on the first screen in response to an operation of switching to a home screen scenario includes: determining, in response to an unlock operation, that unlock succeeds, and displaying the at least one frame of image corresponding to the first home screen scenario on a home screen interface of the first screen.

The displaying the at least one frame of continuous image corresponding to the second home screen scenario on the second screen includes: displaying the at least one frame of continuous image corresponding to the second home screen scenario on a home screen interface of the second screen.

The successively displaying, on the second screen, an image that is corresponding to the first home screen scenario and that is not displayed on the first screen, and the at least one frame of continuous image corresponding to the second home screen scenario includes: successively displaying, on the home screen interface of the second screen, the image that is corresponding to the first home screen scenario and that is not displayed on the first screen, and the at least one frame of continuous image corresponding to the second home screen scenario.

In another possible implementation, the successively displaying the at least one frame of continuous image corresponding to the AOD screen-off scenario and the at least one frame of continuous image corresponding to the lock screen scenario on the first screen in response to an operation of switching to the lock screen scenario includes: determining, in response to an operation of turning on a screen or in response to an unlock operation, that unlock fails. Then the at least one frame of continuous image corresponding to the AOD screen-off scenario is displayed on an AOD screen-off interface of the first screen, and the at least one frame of continuous image corresponding to the lock screen scenario is displayed on a lock screen interface of the first screen.

In another possible implementation, the displaying the at least one frame of continuous image corresponding to the second home screen scenario on the second screen in a reverse sequence of an image arrangement sequence includes: displaying the at least one frame of continuous image corresponding to the second home screen scenario on a home screen interface of the second screen in the reverse sequence of the image arrangement sequence. The displaying a last frame of image corresponding to the first home screen scenario on the first screen includes: displaying the last frame of image corresponding to the first home screen scenario on a home screen interface of the first screen.

In another possible implementation, the displaying a last frame of image corresponding to the lock screen scenario on the second screen includes: displaying the last frame of image corresponding to the lock screen scenario on the lock screen interface of the second screen.

In another possible implementation, the successively displaying the at least one frame of continuous image corresponding to the first home screen scenario and the at least one frame of continuous image corresponding to the second home screen scenario on the second screen in response to an operation of switching to a home screen scenario includes: determining, in response to an unlock operation, that unlock succeeds, and successively displaying the at least one frame of continuous image corresponding to the first home screen scenario, and the at least one frame of continuous image corresponding to the second home screen scenario on the home screen interface of the second screen.

According to a second aspect, this application provides an electronic device, including: one or more processors and a display screen with an adjustable display size, the display screen with an adjustable display size is configured to display a user interface on a first screen or display a user interface on a second screen. A display size of the first screen is different from a display size of the second screen. The display screen is coupled with the one or more processors, and the one or more processors are configured to perform the method for displaying a dynamic wallpaper according to any one of the foregoing first aspect.

It should be understood that descriptions of technical features, technical solutions, beneficial effects, or similar statements in this application do not imply that all features and advantages can be implemented in any single embodiment. On the contrary, it can be understood that descriptions of the features or the beneficial effects mean that at least one embodiment includes a specific technical feature, technical solution, or beneficial effect. Therefore, the descriptions of the technical features, the technical solutions, or the beneficial effects in this specification may not necessarily be specific to a same embodiment. The technical features, technical solutions, or beneficial effects described in the embodiments may be further combined in any proper manner. A person skilled in the art may understand that a specific embodiment may be implemented without using one or more specific technical features, technical solutions, or beneficial effects of the embodiment. In other embodiments, additional technical features and beneficial effects may be further recognized in a specific embodiment that does not reflect all the embodiments.

BRIEF DESCRIPTION OF THE DRAWINGS

FIG. 8A to FIG. 8D are a schematic flowchart of a wallpaper folding process according to an embodiment of this application.

DETAILED DESCRIPTION OF ILLUSTRATIVE EMBODIMENTS

The following clearly and completely describes technical solutions in embodiments of this application with reference to the accompanying drawings in the embodiments of this application. Terms used in the following embodiments are only intended to describe particular embodiments, and are not intended to limit this application. As used in the specification of this application and the appended claims, singular expressions "one", "a", "the", "the foregoing", and "this" are intended to also include, for example, an expression "one or more" unless expressly indicated to the contrary in the context. It should be further understood that in embodiments of this application, "one or more" means one, two, or more than two; and the term "and/or" is only an associative relationship for describing associated objects, indicating that three relationships may exist. For example, A and/or B may represent the following three cases: Only A exists, both A and B exist, and only B exists, where A and B may be singular or plural. The character "/" generally indicates an "or" relationship between the associated objects.

Reference to "an embodiment", "some embodiments", or the like described in this specification means that specific features, structures, or characteristics described with reference to the embodiment are included in one or more embodiments of this application. Therefore, the phrases "in an embodiment", "in some embodiments", "in other embodiments", "in some other embodiments", and the like in different places in this specification are not necessarily all refer to the same embodiment, but mean "one or more but not all embodiments", unless otherwise specifically emphasized. The terms "include", "comprise", "have", and their variants mean "including but not limited to" unless specifically emphasized otherwise.

"A plurality of" in embodiments of this application means two or more. It should be noted that in the description of embodiments of this application, words such as "first" and "second" are merely used for distinguishing, and cannot be understood as an indication or implication of relative importance or an indication or implication of a sequence.

Figure 1:
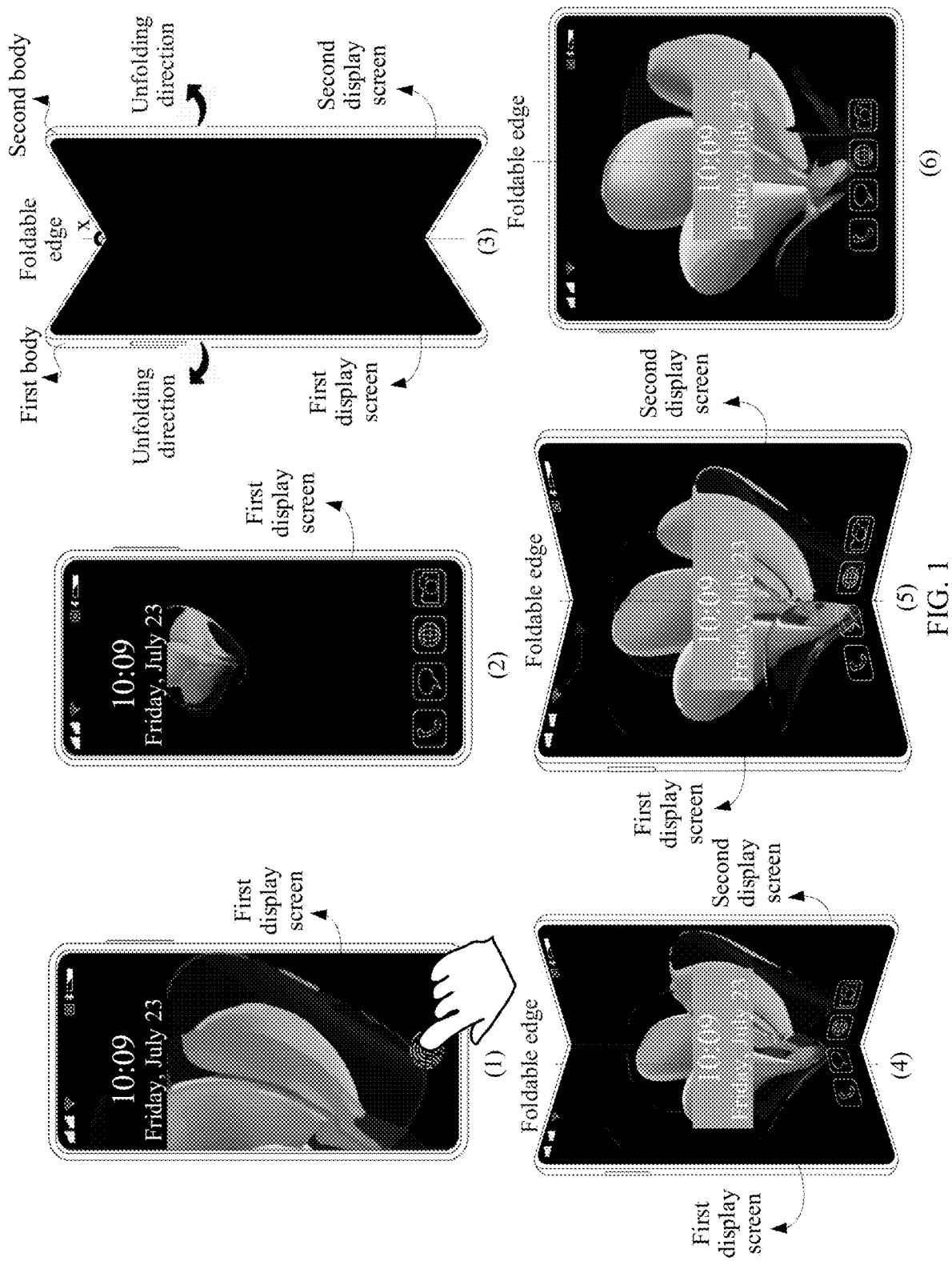
FIG. 1 is a first schematic diagram of an interface change of a foldable phone during unfolding of a foldable screen according to this application.

As foldable screen technologies are increasingly mature, there is an increasing number of foldable phones on the market. For example, as shown in FIG. 1, a foldable phone includes a first body and a second body. A display screen corresponding to the first body is a first display screen of a foldable screen. A display screen corresponding to the second body is a second display screen of the foldable screen. The first display screen may include an inner screen and an outer screen of the first display screen. The second display screen may also include an inner screen and an outer screen of the second display screen. The inner screen is a screen located inside when the foldable screen is in a completely folded state, and the outer screen is a screen located outside in the completely folded state. An included angle between a plane in which the first display screen is located and a plane in which the second display screen is located is a hinge angle x of the foldable phone. For example, a first display screen shown in (1) and (2) of FIG. 1 is the outer screen, and a first display screen and a second display screen shown in (4), (5), and (6) of FIG. 1 are both the internal screens.

For explanation, a state in which the hinge angle x is 0° is referred to as a completely folded state. For example, as shown in (1) of FIG. 1, the foldable phone is in the completely folded state. A state in which the hinge angle x is 180° is referred to as an unfolded state. For example, (6) of FIG. 1 shows the unfolded state. A state in which the hinge angle x is greater than 0° and less than 180° is referred to as a folded state. For example, (3), (4), and (5) of FIG. 1 show the folded state. In addition, to increase detection accuracy, a state in which the hinge angle is greater than or equal to 0° and less than a first preset angle may also be referred to as the completely folded state, and a state in which the hinge angle is greater than or equal to the first preset angle and less than 180° may also be referred to as the folded state. The first preset angle is a preset angle threshold greater than 0°, for example, the angle threshold is 30° or 45°.

The foldable screen of the foldable phone may be folded based on a foldable edge, to display a user interface on a small screen of the foldable phone. The foldable screen of the foldable phone may be alternatively unfolded, to display the user interface on a big screen of the foldable phone.

For example, when the foldable screen is folded based on the foldable edge to be in a state in which the hinge angle x is less than or equal to the first preset angle, the small screen is used to display the user interface. For example, as shown in (2) and (3) of FIG. 1, only the first display screen is used to display the user interface.

For example, when the foldable phone is unfolded around the foldable edge to be in a state in which the hinge angle x is greater than a second preset angle, the big screen is used to display the user interface. For example, as shown in (4), (5), and (6) of FIG. 1, the user interface is displayed on the big screen including the first display screen and the second display screen. For example, when the foldable phone is in the folded state or unfolded state, the user interface may be displayed on the big screen. When the foldable phone is in the completely folded state, the user interface may be displayed on the small screen. For example, the first preset angle may be 30°, and the second preset angle may be 45°. For another example, both the first preset angle and the second preset angle may be 45°, which can be set based on an actual scenario.

In embodiments of this application, a display size of the small screen for displaying the user interface is smaller than a display size of the big screen for displaying the user interface. The small screen in embodiments of this application is not necessarily a single display screen for display, and the big screen does not necessarily include two display screens. A quantity of display screens included in the small screen and a quantity of display screens included in the big screen are not limited in this application. It should be further noted that a display screen used as the small screen and a display screen used as the big screen may be either an internal screen or an external screen, which is not limited in embodiments of this application.

To improve use experience of foldable phones, developers have developed dynamic wallpapers that trigger a dynamic effect while foldable screens are being unfolded or folded. Specifically, to describe the following embodiments clearly and concisely, a solution for displaying a dynamic wallpaper is briefly introduced first.

As shown in (1) of FIG. 1, the foldable phone is in the folded state, and the small screen is in a screen-off state. A user presses a power button to turn on the small screen, so that the small screen switches a lock screen interface as shown in (2) of FIG. 1. The user puts a finger on a fingerprint region of the lock screen interface and performs fingerprint unlock. After unlock succeeds, the user interface displayed on the small screen changes from the lock screen interface shown in (2) to a home screen interface shown in (3). When the user wants to display the home screen interface on the big screen, the user unfolds the foldable screen in a sequence of (3), (4), (5), and (6) shown in FIG. 1. During unfolding, continuous dynamic images as shown in (3), (4), (5), and (6) of FIG. 1 are displayed on a big-screen home screen interface, presenting a dynamic effect.

Specifically, during unfolding, a screen-off phenomenon shown in (3) of FIG. 1 first occurs on the foldable screen. The user continues unfolding the foldable screen based on unfolding directions shown in (3) of FIG. 1, until the hinge angle x of the foldable screen is greater than or equal to 45°. As shown in (4) of FIG. 1, the big screen of the foldable phone starts to display the home screen interface. The user continues unfolding the foldable screen, and the foldable phone is unfolded from a form shown in (4) of FIG. 1 to a form shown in (5) of FIG. 1, until the foldable screen is unfolded in a form shown in (6) of FIG. 1.

When the user wants to display the home screen interface on the small screen, the user folds the foldable screen in a sequence of (6), (5), (4), (3), and (2) shown in FIG. 1. Finally, the foldable screen returns to a state in which the home screen interface is displayed on the small screen shown in (2) of FIG. 1. A sequence during folding in which dynamic images presented by the dynamic wallpaper on a big-screen home screen change is in reverse with a sequence during unfolding in which the dynamic images presented by the dynamic wallpaper on a big-screen home screen change.

It can be known that, from the solution shown in FIG. 1, when the foldable phone switches to the home screen interface, while the user is folding or unfolding the foldable screen, the dynamic wallpaper on the big-screen home screen can be triggered to present the dynamic effect. However, during display on a small-screen home screen, the wallpaper does not present dynamic images. In addition, an image of the wallpaper on the small-screen home screen and an image of the wallpaper on the big-screen home screen are not continuous, which cannot meet a user experience requirement for smoothly switching between the big screen and small screen in use of the foldable phone. For example, in FIG. 1, obviously, wallpaper images shown in (1) and (2) displayed on the small screen and wallpaper images shown in (4), (5), and (6) displayed on the big screen do not change continuously. As a result, the user may feel that the wallpaper presented on the small screen of the foldable phone and the wallpaper presented on the big screen are not continuous.

Based on a problem existing in the foregoing technical solution, an embodiment of this application proposes a method for displaying a dynamic wallpaper, to display a continuously changing dynamic wallpaper on a user interface during switching between a small screen and a big screen for display.

The method for displaying a dynamic wallpaper provided in this embodiment of this application can be applied to electronic devices such as a mobile phone, a tablet computer, or a notebook computer. The electronic device is provided with a foldable screen, a stretchable display screen, or another display screen with a changeable display size. The electronic device can display a user interface with at least two different display sizes. For example, the foldable phone in FIG. 1 can display the user interface on a small screen and big screen.

Figure 2A:
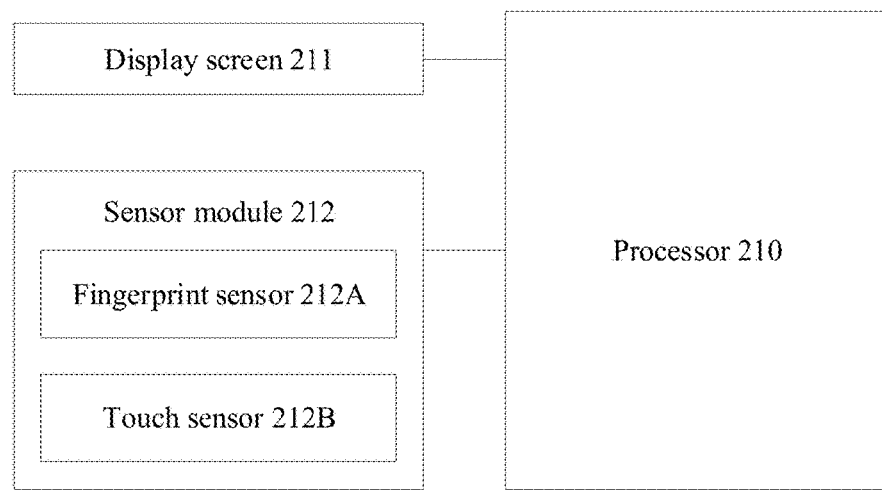
FIG. 2a is a diagram of a hardware structure of an electronic device according to this application.

For example, as shown in FIG. 2a, the electronic device provided in this embodiment of this application may further include a processor 210, a display screen 211, and a sensor module 212. The sensor module 212 may include a fingerprint sensor 212A and a touch sensor 212B.

It can be understood that the structure shown in this embodiment does not specifically limit the electronic device. In some other embodiments, the electronic device may include more or fewer components than those shown in the figure, or combine some components, or split some components, or have different component arrangements. The components in the figure may be implemented by hardware, software, or a combination of software and hardware.

The processor 210 may include one or more processing units. For example, the processor 210 may include an application processor (application processor, AP), a modem processor, a graphics processing unit (graphics processing unit, GPU), an image signal processor (image signal processor, ISP), and a video codec. Different processing units may be separate devices or may be integrated into one or more processors. For example, in this application, the processor 210 may be configured to perform any method for displaying a dynamic wallpaper proposed in this embodiment of this application. For example, the GPU included in the processor 210 may be configured to display, on the display screen 211, a dynamic wallpaper involved in any method for displaying a dynamic wallpaper proposed in embodiments of this application. For details, refer to the following related content of FIG. 4a, FIG. 4c, FIG. 4f, FIG. 5a, FIG. 5b, FIG. 6a, FIG. 6c, FIG. 7, and FIG. 8A to FIG. 8D. The details are not described herein again.

A memory may be further disposed in the processor 210 to store instructions and data.

In some embodiments, the processor 210 may include one or more interfaces. The interface may include a mobile industry processor interface (mobile industry processor interface, MIPI) and the like.

The MIPI interface may be used to connect the processor 210 and peripheral devices such as the display screen 211. The MIPI interface includes a display serial interface (display serial interface, DSI) and the like. In some embodiments, the processor 210 and the display screen 211 communicate with each other by using the DSI to implement a display function of the electronic device. For example, in this embodiment of this application, the processor 210 communicates with the display screen 211 through the DSI interface, so that the dynamic wallpaper involved in any method for displaying a dynamic wallpaper proposed in embodiments of this application can be displayed on the display screen 211. For details, refer to the following related content of FIG. 4a, FIG. 4c, FIG. 4f, FIG. 5a, FIG. 5b, FIG. 6a, FIG. 6c, FIG. 7, and FIG. 8A to FIG. 8D. The details are not described herein again.

It can be understood that, an interface connection relationship between modules shown in this embodiment is merely a schematic description, and does not limit a structure of the electronic device. In some other embodiments of this application, an interface connection mode that is different from those in the foregoing embodiments or a combination of a plurality of interface connection modes can be used for the electronic device.

The display screen 211 is configured to display an image, a video, and the like. The display screen 211 includes a display panel. The display panel may be a liquid crystal display (liquid crystal display, LCD), an organic light-emitting diode (organic light-emitting diode, OLED), an active-matrix organic light emitting diode (active-matrix organic light emitting diode, AMOLED), or the like. In some embodiments, the electronic device may include one or N display screens 211, where N is a positive integer greater than 1. For example, in this embodiment of this application, the display screen 211 may be a display screen with an adjustable display size such as a foldable screen or a stretchable display screen. In this embodiment of this application, the display screen 211 is configured to display a user interface on a small screen or display a user interface on a big screen. A display size of the small screen for displaying the user interface is smaller than a display size of the big screen for displaying the user interface. In some embodiments, the small screen includes a single display screen, and the big screen includes a plurality of display screens.

A series of graphical user interfaces (graphical user interface, GUI) may be displayed on the display screen 211 of the electronic device. For example, in this embodiment of this application, the display screen 211 may be configured to display a user interface and a dynamic wallpaper included in the user interface involved in any method for displaying a dynamic wallpaper proposed in embodiments of this application. For details, refer to the following related content of FIG. 4a, FIG. 4c, FIG. 4f, FIG. 5a, FIG. 5b, FIG. 6a, FIG. 6c, FIG. 7, and FIG. 8A to FIG. 8D. The details are not described herein again.

The fingerprint sensor 212A is configured to collect a fingerprint. The electronic device may implement fingerprint unlock, application lock accessing, fingerprint photographing, fingerprint call answering, and the like by using a feature of a collected fingerprint.

The touch sensor 212B is also referred to as a "touch device". The touch sensor 212B may be disposed in the display screen 211. The touch sensor 212B and the display screen 212 form a touchscreen, which is also referred to as a "touch screen".

In addition, an operating system runs on the foregoing components, for example, an iOS operating system, an Android open-source operating system, or a Windows operating system. An application can be installed and run on the operating system.

Figure 2B:
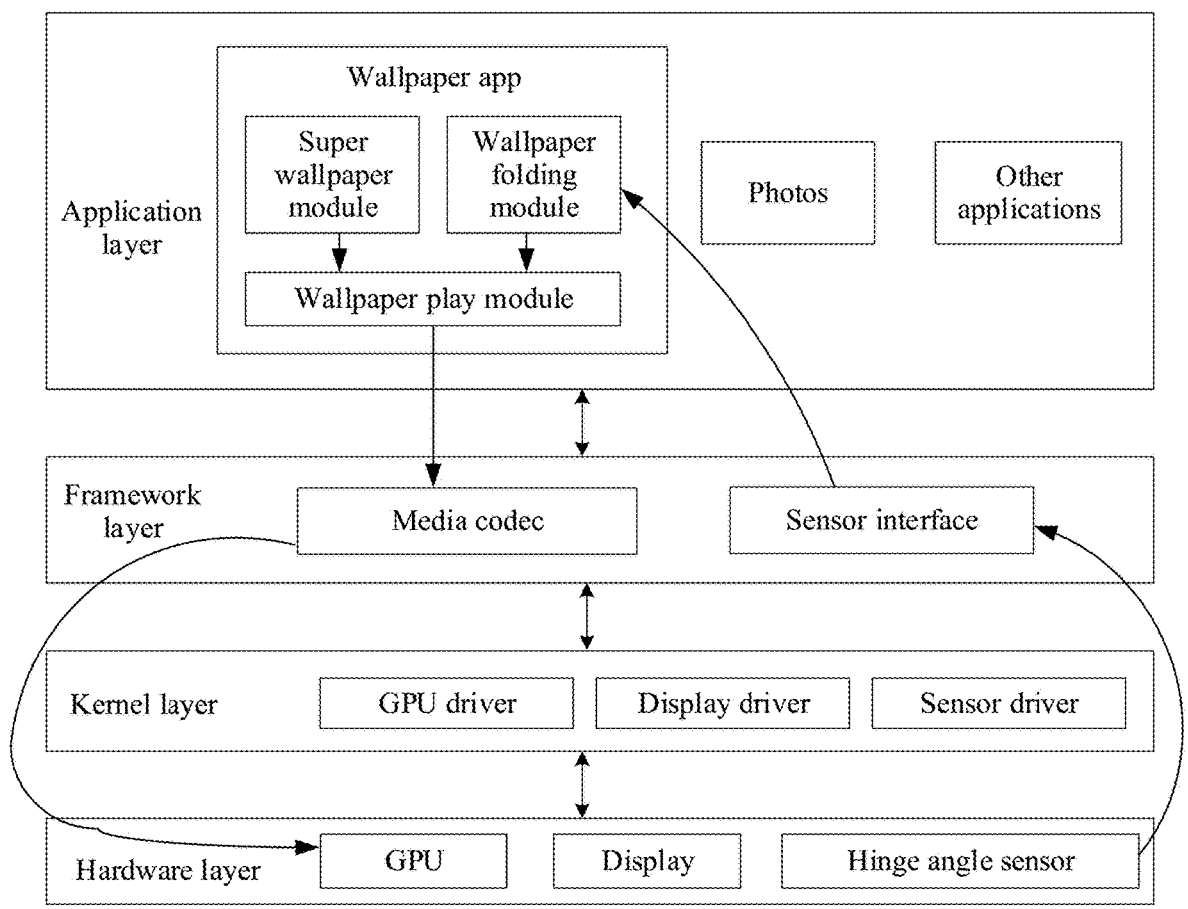
FIG. 2b is a diagram of a software framework of an electronic device according to this application.

FIG. 2b is a block diagram of a software system of an electronic device according to an embodiment of this application. Refer to FIG. 2b, a layered architecture divides software into several layers, and each layer has a clear role and task. The layers communicate with each other by using software interfaces. In some embodiments, the Android system is divided into four layers: an application layer, an application framework layer, a kernel layer, and a hardware layer.

The application layer may include a series of application packages. As shown in FIG. 2b, the application package may include applications such as a wallpaper application (Application, APP) and a gallery.

The wallpaper app includes a super wallpaper module, a wallpaper folding module, and a wallpaper play module. The super wallpaper module is configured to perform a super wallpaper process. The wallpaper folding module is configured to perform a wallpaper folding process. The wallpaper play module is configured to trigger a display screen to play a wallpaper.

The super wallpaper process is as follows: if it is detected that switch between scenarios occurs, a wallpaper corresponding to a scenario that is switched to is determined, the determined wallpaper is sent to the wallpaper play module, and the wallpaper play module triggers the display screen for display. Different scenarios correspond to different wallpapers. The wallpaper includes a dynamic wallpaper or a static wallpaper. The scenarios include at least two of an AOD screen-off scenario, a lock screen scenario, and a home screen scenario.

For example, in the super wallpaper process, wallpaper switch can be implemented with one-shot during switching between different scenarios, from the AOD screen-off scenario, the lock screen scenario, to the home screen scenario, so that the display screen can display different wallpapers when switching to different scenarios. This improves flexibility and diversity of wallpaper display, and further improves user experience.

The wallpaper folding process is as follows: after it is detected that an electronic device is switched to a folded state, an image of the dynamic wallpaper is determined based on a change of a hinge angle, the determined image is sent to the wallpaper play module, and the wallpaper play module triggers the display screen for play. Different hinge angles correspond to different images in the dynamic wallpaper. Therefore, when the hinge angle is different, the display screen can display different images. Therefore, the wallpaper can be dynamically played with the change of the hinge angle by the user, and flexibility of wallpaper display and user experience can be increased.

The application framework layer provides an application programming interface (application programming interface, API) and a programming framework for an application on the application layer. The application framework layer includes some predefined functions. As shown in FIG. 2b, the application framework layer may include a media codec and a sensor interface.

The media codec is configured to encode audio and video. For example, the media codec can encode and decode common audio and video formats such as H.264 (a digital video compression format), H.265 (a digital video compression format), advanced audio coding (AAC), 3gp (a video coding container format for 3G streaming media). For example, the media codec belongs to MediaCodec. MediaCodec is provided by Android to access an interface of a low-level multimedia codec, and can encode and decode common audio and video formats such as H.264, H.265, AAC, and 3gp.

The sensor interface is an interface for accessing a related sensor in the hardware layer, such as an interface for accessing a folding angle sensor in the hardware layer, and can obtain data collected by a hinge angle sensor. For example, the sensor interface is a sensor, and data of the sensor can be listened and registered by registering with the sensor.

In addition, the application framework layer may further include a window manager, a content provider, a view system, a phone manager, a resource manager, a notification manager, and the like. The window manager is configured to manage a window application. The window manager may obtain a size of a display screen, determine whether there is a status bar, lock a screen, screenshot, and the like. The content provider is configured to store and obtain data and enable the data to be accessed by an application. The data may include a video, an image, audio, calls made and answered, a browsing history and bookmarks, an address book, and like. The view system includes visual controls such as a control for displaying a text and a control for displaying a picture. The view system can be configured to construct a display interface of an application. The display interface may include one or more views, for example, include a view showing a messaging notification icon, a view showing a character, and a view showing a picture. The phone manager is configured to provide a communication function for the electronic device, for example, management of a call status (including answering, hangup, and the like). The resource manager provides resources for applications, such as a localized string, an icon, a picture, a layout file, and a video file. The notification manager enables an application to display notification information in the status bar that may be used to convey a message of a notification type, and the message may disappear automatically after a short stay without user interaction. For example, the notification manager is configured to notify download completion, give a message notification, and the like. The notification manager may be further a notification that appears in a top status bar of the system in a form of a graph or scroll bar text, for example, a notification of an application running in the background. The notification manager may be further a notification that appears on a screen in a form of a dialog window. For example, text information is prompted in the status bar, a notification sound is produced, the electronic device vibrates, or the indicator light blinks.

The kernel layer is a layer between hardware and software. The kernel layer includes at least a graphics processing unit (graphics processing unit, GPU) driver, a display driver, and a sensor driver. The GPU driver is configured to drive the GPU, the display driver is configured to drive a display, and the sensor driver is configured to drive a sensor, such as driving the hinge angle sensor.

The hardware layer includes at least the GPU, the display, and the hinge angle sensor. The GPU is a microprocessor specially used for image and graphic related operations. The display is used for graphic display. The display may include one or more display screens, and at least one of the one or more display screens can be folded. The hinge angle sensor is configured to detect a hinge angle of a foldable screen in the display.

The following describes examples of working processes of software and hardware of the electronic device with reference to a wallpaper display scenario.

For the super wallpaper module in the wallpaper app, if it is detected that switching between scenarios for the electronic device occurs, a wallpaper corresponding to a scenario that is switched to can be determined, the determined wallpaper is sent to the wallpaper play module, and the wallpaper play module triggers display. A process that the wallpaper play module triggers display of a wallpaper may include the following steps: The wallpaper play module sends a wallpaper to be displayed to a media codec, and the media codec encodes the wallpaper to be displayed and sends encoded wallpaper data to the GPU. The GPU decodes the encoded wallpaper data, and then pushes a decoded wallpaper to the display for display.

In addition, for the wallpaper folding module in the wallpaper app, the wallpaper folding module can listen to, through the sensor interface, a hinge angle collected by the hinge angle sensor. When it is determined, based on an obtained hinge angle by listening, that the electronic device is in a folded state, the wallpaper folding process is performed. An image of the dynamic wallpaper is determined based on a change of the hinge angle, and the determined image is sent to the wallpaper play module. The wallpaper play module triggers a display screen for play.

To clearly describe the following embodiments of a method for displaying a dynamic wallpaper proposed in this application, first, a pre-configured dynamic wallpaper in embodiments of this application is briefly described by taking the electronic device as a foldable phone as an example.

The foldable phone proposed in embodiments of this application can be pre-configured with dynamic wallpapers. The dynamic wallpapers include wallpapers corresponding to a plurality of scenarios. The wallpapers corresponding to a plurality of scenarios may include: a dynamic wallpaper corresponding to an AOD screen-off scenario, a static wallpaper corresponding to a lock screen scenario, a dynamic wallpaper corresponding to a small-screen home screen scenario, and a dynamic wallpaper corresponding to a big-screen home screen scenario.

The dynamic wallpaper may be a wallpaper video or a dynamic image, as long as the dynamic wallpaper can present a dynamic effect. A specific type and file format of the dynamic wallpaper is not limited in this embodiment of this application.

The dynamic wallpaper corresponding to the AOD screen-off scenario is used for display during switching from the AOD screen-off scenario to the lock screen scenario, or switching from another screen-off scenario to the lock screen scenario. The static wallpaper corresponding to the lock screen scenario is used for display in the lock screen scenario. The dynamic wallpaper corresponding to the small-screen home screen scenario is used for display when the small-screen home screen scenario is switched to, and is also used for display when the big-screen home screen scenario is switched to in some cases. The dynamic wallpaper corresponding to the big-screen home screen scenario is used for display when the big-screen home screen scenario is switched to.

AOD screen-off is a display function that a region of a screen remains on when a screen of a mobile phone is off. A mobile phone with a function of the AOD screen-off can display information such as time and notice locally when a screen of the mobile phone is off. In some embodiments, a dynamic wallpaper may also be used in the lock screen scenario. That is, a wallpaper corresponding to each scenario included for the dynamic wallpaper may be either a dynamic wallpaper or static wallpaper.

The AOD screen-off scenario mentioned in any method for displaying a dynamic wallpaper proposed in embodiments of this application can be understood as a scenario in which a user interface is an AOD screen-off interface, and may be specifically divided into a small-screen AOD screen-off scenario and a big-screen AOD screen-off scenario. A home screen scenario is a scenario in which the user interface is home screen interface, and may also be specifically divided into the small-screen home screen scenario and the big-screen home screen scenario. The lock screen scenario is a scenario in which the user interface is a lock screen interface, and may also be specifically divided into the small-screen lock screen scenario and the big-screen lock screen scenario.

A dynamic wallpaper corresponding to a scenario includes a plurality of frames of continuously changing wallpaper images corresponding to the scenario. The plurality of frames of continuously changing wallpaper images corresponding to the scenario are arranged in a sequence of continuous change. A static wallpaper corresponding to a scenario includes a frame of wallpaper image corresponding to the scenario. When the foldable phone plays a wallpaper corresponding to a scenario included in the wallpapers corresponding to a plurality of scenarios in a sequence of scenario generation (or sequence of scenario association), the wallpaper displayed on the user interface can present continuously changing images. Further, during switching from a small screen to a big screen, or from a big screen to a small screen, the user can see a continuous dynamic effect presented by the wallpaper. This not only provides the user with use experience of smoothly switching between display screens during unfolding or folding of a display screen, but also provides the user with novel and interesting experience in use of the foldable phone.

For example, the wallpapers corresponding to a plurality of scenarios can be generated in the following manner: A continuous dynamic wallpaper video is pre-recorded, a plurality of frames of continuously changing wallpaper images are obtained from the dynamic wallpaper video, the plurality of frames of continuously changing wallpaper images are divided into a plurality of frames of continuous wallpaper images in a first time period, a single frame of wallpaper image in a second time period, a plurality of frames of continuous wallpaper images in a third time period, and a plurality of frames of continuous wallpaper images in a fourth time period in a sequence of time. The plurality of frames of continuous wallpaper images in the first time period is a dynamic wallpaper corresponding to the AOD screen-off scenario. The single frame of wallpaper image in the second time period is the static wallpaper corresponding to the lock screen scenario. The plurality of frames of continuous wallpaper images in the third time period is the dynamic wallpaper corresponding to the small-screen home screen scenario. The plurality of frames of continuous wallpaper images in the fourth time period is the dynamic wallpaper corresponding to the big-screen home screen scenario. The wallpapers corresponding to a plurality of scenarios are generated in a plurality of manners, including but not limited to content proposed in this embodiment of this application.

Figure 3:
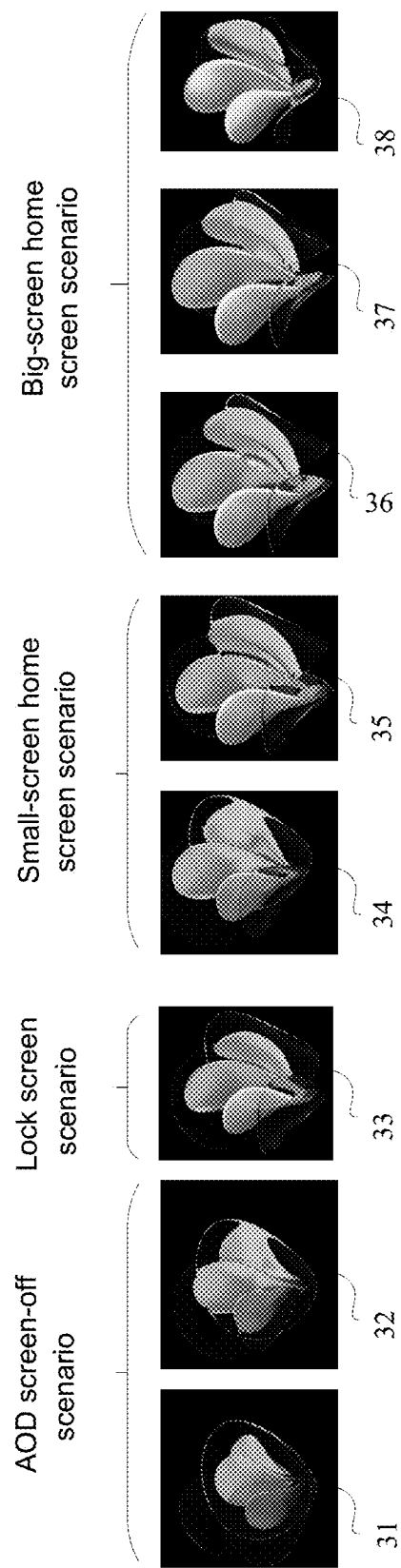
FIG. 3 is a schematic diagram of a wallpaper corresponding to a plurality of scenarios according to this application.

For example, FIG. 3 shows 8 frames of continuously changing wallpaper images of wallpapers corresponding to a plurality of scenarios. Specifically, in the pre-configured wallpapers corresponding to a plurality of scenarios in this embodiment, a wallpaper 31 is a key frame 1, a wallpaper 32 is a key frame 2, a wallpaper 33 is a key frame 3, a wallpaper 34 is a key frame 4, a wallpaper 35 is a key frame 5, a wallpaper 36 is a key frame 6, a wallpaper 37 is a key frame 7, and a wallpaper 38 is a key frame 8.

The wallpaper 31 and wallpaper 32 are key frames of a dynamic wallpaper corresponding to an AOD screen-off scenario. For example, a dynamic wallpaper corresponding to the AOD screen-off scenario includes 70 frames of continuous images corresponding to the AOD screen-off scenario. The wallpaper 33 is a static wallpaper corresponding to a lock screen scenario. The wallpaper 34 and the wallpaper 35 are key frames of a dynamic wallpaper corresponding to a small-screen home screen scenario. For example, the dynamic wallpaper corresponding to the small-screen home screen scenario includes a total of 60 frames of continuous images corresponding to the small-screen home screen scenario. The wallpaper 36, wallpaper 37, and wallpaper 38 are key frames corresponding to a big-screen home screen scenario. For example, a dynamic wallpaper corresponding to the big-screen home screen scenario includes a total of 240 frames of continuous images corresponding to the big-screen home screen scenario.

Taking a foldable phone as an example, based on the pre-configured wallpapers corresponding to a plurality of scenarios in the foregoing embodiment of this application, a scenario in which a method for displaying a dynamic wallpaper proposed in an embodiment of this application is applied is described below.

The method for displaying a dynamic wallpaper proposed in this embodiment of this application can be applied to a scenario of switch between a big screen and a small screen, to implement switching between the big screen and the small screen, and display a continuously changing dynamic wallpaper on a user interface. During unfolding from the small screen to the big screen, continuously changing dynamic wallpaper images can be displayed from a small-screen user interface to a big-screen user interface. During folding from the big screen to the small screen, continuously changing dynamic wallpaper images can be displayed from the big-screen user interface to the big-screen user interface.

The method for displaying a dynamic wallpaper proposed in this embodiment of this application may also be applied to a big screen scenario. The big screen scenario is a scenario in which the foldable phone displays the user interface on the big screen. In the big screen scenario, in the method for displaying a dynamic wallpaper proposed in this embodiment of this application, the continuous dynamic wallpaper images may also be displayed on the big-screen user interface.

The method for displaying a dynamic wallpaper proposed in this embodiment of this application may also be applied to a small screen scenario. The small screen scenario is a scenario in which the foldable phone displays the user interface on the small screen. In the small screen scenario, in the method for displaying a dynamic wallpaper proposed in this embodiment of this application, the continuous dynamic wallpaper images may also be displayed on the user interface.

A display process of a dynamic wallpaper in a scenario of switching between the big screen and the small screen, a display process of a dynamic wallpaper in the big screen scenario, and a display process of a dynamic wallpaper in the small screen scenario in this application are described below.

(1) Scenario of Switching Between the Big Screen and the Small Screen

Figure 4A:
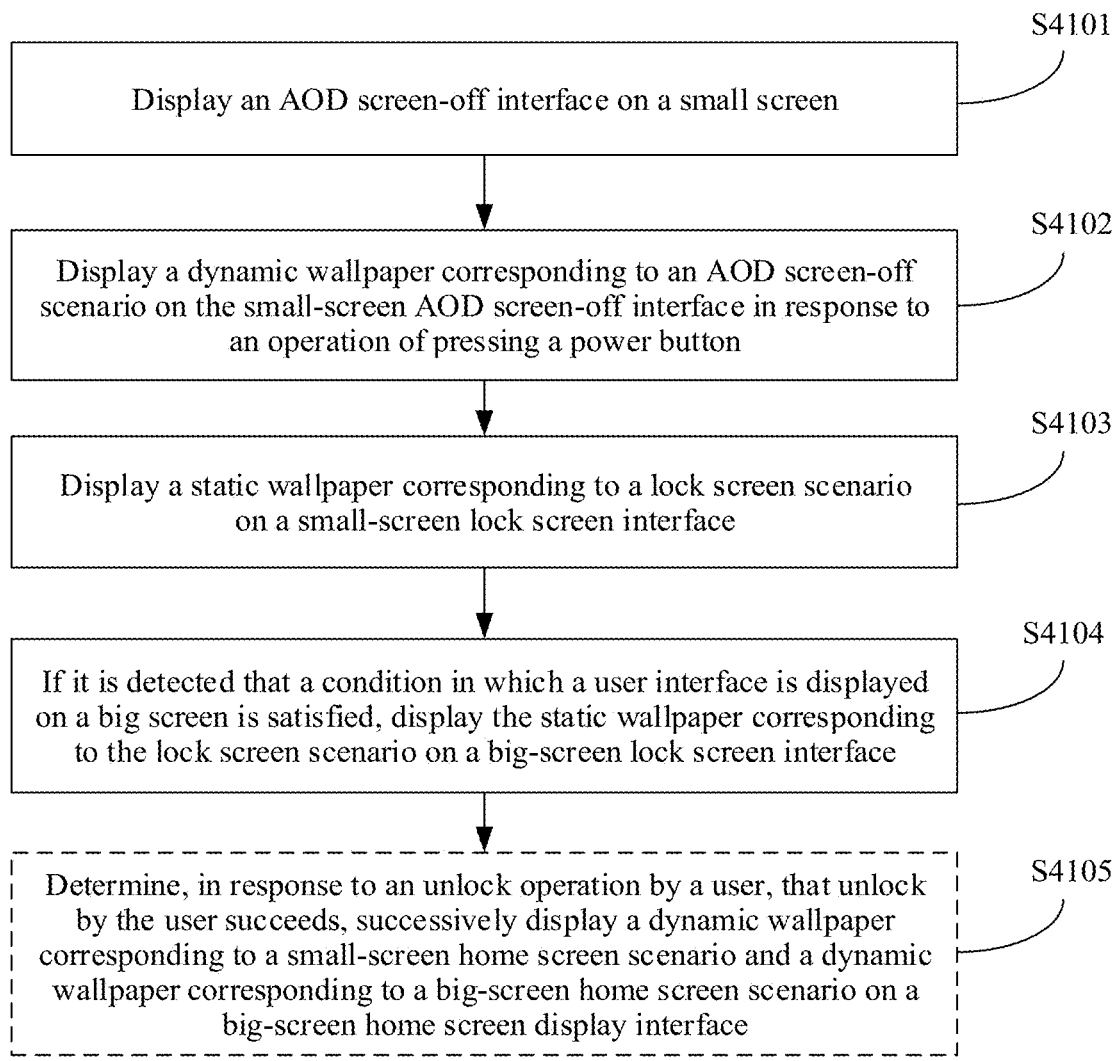
FIG. 4a is a first flowchart of a method for displaying a dynamic wallpaper according to this application.

FIG. 4a is a first flowchart of a method for displaying a dynamic wallpaper proposed in an embodiment of this application. The method shown in FIG. 4a is applied to the following scenario: A foldable phone switches from a small-screen AOD screen-off scenario to a small-screen lock screen scenario, from the small-screen lock screen scenario to a big-screen lock screen scenario, and then from the big-screen lock screen scenario to a big-screen home screen scenario.

The method shown in FIG. 4a is applied to the electronic device proposed in embodiments of this application. In the application scenario, continuously changing dynamic wallpapers can be displayed based on the pre-configured wallpapers corresponding to a plurality of scenarios proposed in the foregoing embodiment of this application. Specifically, taking the foldable phone as an example, steps shown in FIG. 4a are described as follows.

S4101: Display an AOD screen-off interface on a small screen.

No wallpaper image is displayed on the AOD screen-off interface in step S4101. Specifically, when the foldable phone satisfies a condition in which a user interface is displayed on the small screen is satisfied, and switches to the AOD screen-off scenario, the AOD screen-off interface is displayed on the small screen. A condition in which the foldable phone displays the user interface on the small screen may be that a foldable screen is folded until a hinge angle x is less than or equal to a first preset angle, which is not limited in this embodiment of this application.

There is also a plurality of ways to trigger the foldable phone to switch to the AOD screen-off scenario. For example, when the foldable phone does not receive any user operation within preset duration, the foldable phone automatically switches to the AOD screen-off scenario and displays the AOD screen-off interface on the small screen.

For another example, when an operation that a user taps to switch to AOD screen-off is received, in response to the operation that a user taps to switch to AOD screen-off, the AOD screen-off scenario is switched to, and the AOD screen-off interface is displayed on the small screen.

AOD screen-off is a display function that a region of a screen remains on when a screen of a mobile phone is off. A mobile phone with a function of the AOD screen-off can display information such as time and notice locally when a screen of the mobile phone is off. For example, as shown in (1) of FIG. 4b, time is locally displayed on an AOD screen-off interface.

For example, the AOD screen-off interface only locally displays information such as time and notice, and does not display any wallpaper.

S4102: Display a dynamic wallpaper corresponding to the AOD screen-off scenario on the small-screen AOD screen-off interface in response to an operation of pressing a power button.

When a user intends to switch from the AOD screen-off scenario to a lock screen scenario, the user may control, by pressing the power button, the foldable phone to switch from the AOD screen-off scenario to the lock screen scenario. Specifically, the user presses the power button, and the foldable phone receives an operation of pressing the power button by the user. In response to the operation of pressing the power button by the user, the foldable phone is triggered to display the dynamic wallpaper corresponding to the AOD screen-off scenario on the AOD screen-off interface displayed on the small screen. Then step S4103 is performed to switch to a lock screen interface. In this embodiment, the dynamic wallpaper corresponding to the AOD screen-off scenario is displayed while the foldable phone is switching from the AOD screen-off scenario to the lock screen scenario.

Because wallpapers corresponding to a plurality of scenarios are pre-configured in the foldable phone in this embodiment of this application, it can be known, from the foregoing description of the wallpapers corresponding to a plurality of scenarios, that the wallpapers corresponding to a plurality of scenarios include the dynamic wallpaper corresponding to the AOD screen-off scenario. Therefore, when the foldable phone receives the operation of pressing the power button, the foldable phone can display the dynamic wallpaper corresponding to the AOD screen-off scenario on the small screen in response to the operation of pressing the power button.

Refer to a manner in which a dynamic image or video in an operating system such as Android is displayed for a process of displaying the dynamic wallpaper corresponding to the AOD screen-off scenario on a small-screen screen-off interface. Details are not described in this embodiment of this application.

For example, the dynamic wallpaper corresponding to the AOD screen-off scenario may be a wallpaper video corresponding to the AOD screen-off scenario, a process of performing step S4102 may be playing the wallpaper video corresponding to the AOD screen-off scenario on the small-screen AOD screen-off interface in response to the operation of pressing the power button. For example, the dynamic wallpaper corresponding to the AOD screen-off scenario may alternatively be a dynamic image corresponding to the AOD screen-off scenario, and a process of performing step S4102 may alternatively be displaying the dynamic image corresponding to the AOD screen-off scenario on the small screen in response to the operation of pressing the power button.

It can be known, from the foregoing description of the pre-configured wallpapers corresponding to a plurality of scenarios, that the dynamic wallpaper corresponding to the AOD screen-off scenario includes a plurality of frames of continuously changing wallpaper images corresponding to the AOD screen-off scenario. A process of displaying the dynamic wallpaper corresponding to the AOD screen-off scenario on the small screen can be understood as successively displaying, based on a sequence in which wallpaper images are continuously changed, the plurality of frames of continuously changing wallpaper images corresponding to the AOD screen-off scenario on the small screen, to present a dynamic effect to the user.

Figure 4B:
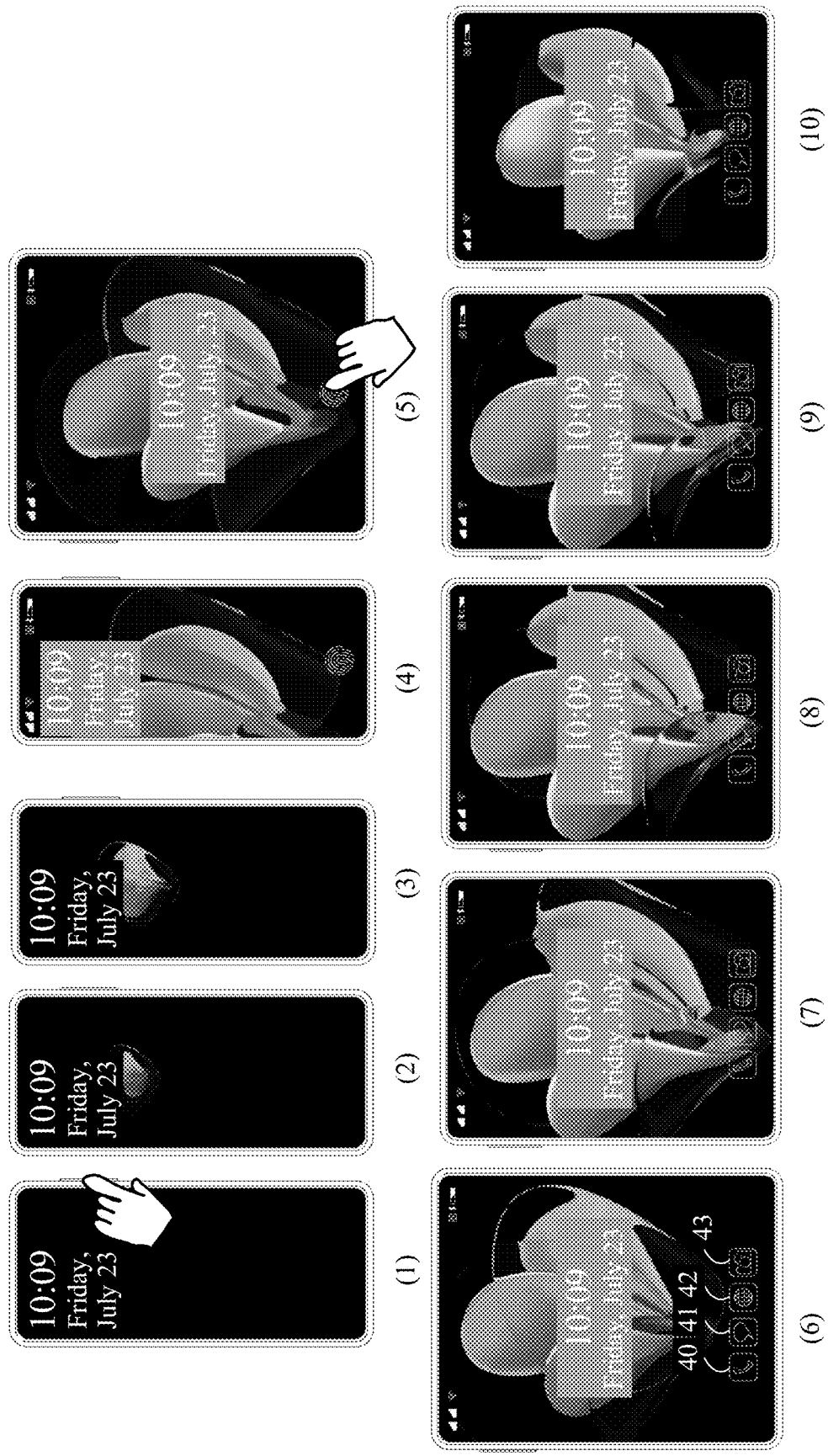
FIG. 4b is a second schematic diagram of an interface change of a foldable phone during unfolding of a foldable screen according to this application.

For example, if the pre-configured wallpapers corresponding to a plurality of scenarios for the foldable phone include wallpaper images shown in FIG. 3, as shown in FIG. 4b, a small screen of the foldable phone shows an AOD screen-off interface in (1) of FIG. 4b. If the user presses a power button on a right side of the foldable phone, a small-screen screen-off interface changes from (1) of FIG. 4b to (2) of FIG. 4b, and then from (2) of FIG. 4b to (3) of FIG. 4b. (2) of FIG. 4b displays the wallpaper image 31 of the dynamic wallpaper corresponding to the AOD screen-off scenario shown in FIG. 3. (3) of FIG. 4b displays the wallpaper image 32 of the dynamic wallpaper corresponding to the AOD screen-off scenario shown in FIG. 3. A dynamic change of petals on a wallpaper can be noticed based on the wallpaper images shown in (2) of FIG. 4b and (3) of FIG. 4b.

In some embodiments, duration in which the dynamic wallpaper corresponding to the AOD screen-off scenario is displayed can be further preset. For example, display duration corresponding to the AOD screen-off scenario may be preset to 2.3 s. Further, each frame of wallpaper image of the dynamic wallpaper corresponding to the AOD screen-off scenario can be displayed successively in a sequence of continuous changes within 2.3 s.

It should be noted that, while the dynamic wallpaper corresponding to the AOD screen-off scenario is displayed on the small screen, a display size of the dynamic wallpaper can be variable. For example, the dynamic wallpaper may be gradually enlarged during display, a specific region in the dynamic wallpaper corresponding to the AOD screen-off scenario can be selected for display, or the like. Further, a speed at which each frame of wallpaper image included in the dynamic wallpaper is displayed can be adjusted. A specific manner in which the dynamic wallpaper corresponding to the AOD screen-off scenario used for the foldable phone is displayed on the small screen is not limited in this embodiment of this application.

It should be further noted that the operation of pressing the power button is only an example of a trigger operation to trigger the foldable phone to switch from the AOD screen-off scenario to the lock screen scenario. There is a plurality of operations that trigger the foldable phone to display the dynamic wallpaper corresponding to the AOD screen-off scenario. For example, in addition to the operation of pressing the power button to turn on a screen, thereby switching to the lock screen scenario, there may be an operation of tapping a touch screen to turn on the screen, thereby switching to the lock screen scenario, an operation of recognizing a human face by mistake by the foldable phone, or another operation of an unlock failure that can trigger the foldable phone to switch from the AOD screen-off scenario to the lock screen scenario, and further trigger display of the dynamic wallpaper corresponding to the AOD screen-off scenario on the small screen. A specific manner in which switching from the AOD screen-off interface to the lock screen interface is triggered is not limited in this embodiment of this application.

S4103: Display a static wallpaper corresponding to the lock screen scenario on a small-screen lock screen interface.

For example, after display of all wallpaper images of the dynamic wallpaper corresponding to the AOD screen-off scenario is completed, the small screen is triggered to switch to the lock screen scenario, and the static wallpaper corresponding to the lock screen scenario is displayed on the small-screen lock screen interface.

For example, duration in which the dynamic wallpaper corresponding to the AOD screen-off scenario is displayed can be preset as first preset duration. The first preset duration may also be preset, for example, may be set to 2.3 s.

For example, a process of performing step S4103 may be as follows: When the foldable phone detects that duration in which the dynamic wallpaper corresponding to the AOD screen-off scenario is displayed reaches the first preset duration, the small-screen user interface is changed from the AOD screen-off interface to the lock screen interface, and the static wallpaper corresponding to the lock screen scenario is displayed on the lock screen interface.

For example, if the dynamic wallpaper corresponding to the AOD screen-off scenario is the wallpaper video corresponding to the AOD screen-off scenario, the first preset duration may be set as total play duration of the wallpaper video. After the dynamic wallpaper corresponding to the AOD screen-off scenario is displayed in the first preset duration, play of the wallpaper video ends, so that the AOD screen-off scenario ends. Then the lock screen scenario is switched to, and the lock screen interface is switched to for display. A wallpaper displayed on the lock screen interface is the static wallpaper corresponding to the lock screen scenario. The lock screen interface can provide a user with a function such as unlock.

Through step S4101 to step S4103, the foldable phone changes from the AOD screen-off interface to the lock screen interface. It can be known, from the foregoing description of the wallpapers corresponding to a plurality of scenarios, that the dynamic wallpaper corresponding to the AOD screen-off scenario and the static wallpaper corresponding to the lock screen scenario are a plurality of frames of continuously changing wallpaper images.

Therefore, during switching from the small-screen AOD screen-off interface to the lock screen interface, the wallpapers also change continuously. For example, still refer to FIG. 4b. The foldable phone displays the AOD screen-off interface shown in (1). After receiving the operation of pressing the power supply, performing step S4102 is triggered. After continuously changing from (1), (2), to (3) of FIG. 4b is presented on the AOD screen-off interface, the lock screen interface shown in (4) of FIG. 4b is switched to. A fingerprint pattern on the lock screen interface prompts the user to perform fingerprint unlock. A wallpaper with petals shown in (4) of FIG. 4b is a wallpaper image 33 obtained by enlarging and cutting off the wallpaper image 33 corresponding to the lock screen scenario shown in FIG. 3. It can be seen, from the wallpaper with petals shown in (4) of FIG. 4b, that wallpapers with petals in (1), (2), (3), and (4) of FIG. 4b present a continuously changing effect.

In some other embodiments, the wallpaper corresponding to the lock screen scenario may also be a dynamic wallpaper. When step S4103 is performed, the dynamic wallpaper corresponding to the lock screen scenario can be displayed on the lock screen interface, and a section of a dynamic wallpaper that is continuous with the previous dynamic wallpaper corresponding to the AOD screen-off scenario is displayed continually.

For example, in some embodiments, a process of performing step S4102 and step S4103 may be as follows: When a display screen receives an operation of switching from the AOD screen-off scenario to the lock screen scenario, a system sends information about scenario switching to a wallpaper app in response to the operation of switching to the lock screen scenario. A super wallpaper module in the wallpaper app receives the information about scenario switching sent by the system. The information is used to indicate that the foldable phone switches from the AOD screen-off scenario to the lock screen scenario. Based on the information about scenario switching, the super wallpaper module determines the dynamic wallpaper corresponding to the AOD screen-off scenario and the static wallpaper corresponding to the lock screen scenario, and sends the dynamic wallpaper corresponding to the AOD screen-off scenario and the static wallpaper corresponding to the lock screen scenario to a wallpaper play module. The wallpaper play module sends a wallpaper to be displayed to a media codec, and the media codec encodes the wallpaper to be displayed and sends encoded wallpaper data to a GPU. The GPU decodes the encoded wallpaper data, and then pushes a decoded wallpaper to a display screen corresponding to a small screen in a display. The display screen corresponding to the small screen successively displays the dynamic wallpaper corresponding to the AOD screen-off scenario and the static wallpaper corresponding to the lock screen scenario.

Refer to related content in FIG. 2b for working principles of the wallpaper app, the super wallpaper module, the wallpaper play module, the media codec, the display, and the GPU. The details are not described herein again.

It should be noted that step S4101 to step S4103 in this embodiment of this application may be applied to a process of changing from the AOD screen-off interface to the lock screen interface, and may also be applied to a process of changing from another type of screen-off interface, such as a screen-off interface, to the lock screen interface.

It should be further noted that, for related description of the dynamic wallpaper corresponding to the AOD screen-off scenario and the static wallpaper corresponding to the lock screen scenario, refer to foregoing related content of the wallpapers corresponding to a plurality of scenarios. The details are not described herein again.

S4104: If it is detected that a condition in which a user interface is displayed on a big screen is satisfied, display the static wallpaper corresponding to the lock screen scenario on a big-screen lock screen interface.

Specifically, when the user unfolds a foldable screen of the foldable phone, the foldable phone detects that the condition in which a user interface is displayed on a big screen is satisfied currently, and then switches to the big screen as a screen for displaying the user interface, and continues to display the lock screen interface in step S4103 on the big screen.

In some embodiments, while the user is unfolding the foldable screen of the foldable phone, all display screens of the foldable screen will be off. After screen-off within a short period of 200 ms to 300 ms, when the foldable phone detects that the condition in which a user interface is displayed on a big screen is satisfied, the big screen of the foldable phone is on, and the lock screen interface is displayed on the big screen. At this time, a wallpaper on the lock screen interface is a static wallpaper corresponding to the lock screen scenario.

For example, when the big screen is switched to for displaying the lock screen interface, the static wallpaper corresponding to the lock screen scenario displayed on the lock screen interface may be the same as the static wallpaper displayed on the small screen in step S4104. However, when the wallpaper is displayed on a big-screen interface, a display size of the static wallpaper and a region in which the static wallpaper is displayed may be adjusted, to be distinguished from the small-screen lock screen interface. For example, as shown in FIG. 4b, the user unfolds the foldable phone from (4) of FIG. 4b to (5) of FIG. 4b. (4) and (5) of FIG. 4b both display the wallpaper image 33 corresponding to the lock screen scenario shown in a figure on the lock screen interface. However, (4) of FIG. 4b shows an image of a right half of the wallpaper image 33 on the small screen, while (5) of FIG. 4b completely shows the wallpaper image 33 on the big screen.

The condition in which a user interface is displayed on a big screen is satisfied may be that a folding angle x is greater than a second preset angle, and the condition in which a user interface is displayed on a big screen is satisfied may also be set as another condition. The condition in which a user interface is displayed on a big screen is satisfied is not limited in this embodiment of this application.

S4105: Determine, in response to an unlock operation by a user, that unlock by the user succeeds, successively display a dynamic wallpaper corresponding to a small-screen home screen scenario and a dynamic wallpaper corresponding to a big-screen home screen scenario on a big-screen home screen display interface.

It can be known, from the foregoing description of the pre-configured wallpapers corresponding to a plurality of scenarios, that the pre-configured wallpapers corresponding to a plurality of scenarios can form continuous dynamic images when displayed successively in a sequence of scenario generation. The pre-configured wallpapers corresponding to a plurality of scenarios in this embodiment form continuous dynamic images when displayed successively in a sequence of the dynamic wallpaper corresponding to the AOD screen-off scenario, the static wallpaper corresponding to the lock screen scenario, the dynamic wallpaper corresponding to the small-screen home screen scenario, and the dynamic wallpaper corresponding to the big-screen home screen scenario. Therefore, although there is no small-screen home screen scenario in a scenario of this example, to ensure continuity of images, after the unlock operation by the user is received, and in response to the unlock operation by the user, after the unlock operation by the user is verified to be successful, a home screen interface is displayed, and the dynamic wallpaper corresponding to the small-screen home screen scenario and the dynamic wallpaper corresponding to the big-screen home screen scenario are displayed successively on the home screen interface.

That the dynamic wallpaper corresponding to the small-screen home screen scenario and the dynamic wallpaper corresponding to the big-screen home screen scenario are displayed successively can be understood as that after successive display of each frame of continuously changing dynamic wallpaper of the dynamic wallpaper corresponding to the small-screen home screen scenario is completed, each frame of continuously changing dynamic wallpaper of the dynamic wallpaper corresponding to the big-screen home screen scenario is displayed successively.

In step S4105, only when the foldable phone receives the unlock operation and determines that the user performed unlock successfully, switch to a big-screen home screen interface is triggered, and the dynamic wallpaper corresponding to the small-screen home screen scenario and the dynamic wallpaper corresponding to the big-screen home screen scenario are displayed successively on the big-screen home screen interface.

There is a plurality of unlock operations by the user, such as unlock by face recognition, unlock by entering a password, fingerprint unlock, unlock by sliding, or the like. The unlock operations by the user mentioned in this embodiment of this application is only an example of a trigger operation to trigger the foldable phone to switch from the lock screen scenario to the home screen scenario. A specific manner in which switching from the lock screen interface to the home screen interface is triggered is not limited in this embodiment of this application.

In some embodiments, duration in which the dynamic wallpaper is displayed in the big-screen home screen scenario can be preset as second preset duration. That is, after unlock succeeds, and the big screen is controlled to display the home screen interface, each frame of wallpaper image of the dynamic wallpaper corresponding to the small-screen home screen scenario and each frame of wallpaper image of the dynamic wallpaper corresponding to the big-screen home screen scenario are displayed successively within the second preset duration, until a last frame of wallpaper image is displayed. Then the last frame of wallpaper image may be used as a static wallpaper of the big-screen home screen. A value of the second preset duration may be set arbitrarily, for example, may be set to 2.5 s.

In some other embodiments, duration in which a dynamic wallpaper corresponding to each scenario is displayed may also be preset. For example, duration in which the dynamic wallpaper corresponding to the small-screen home screen scenario is displayed may be preset to 0.8 s, and duration in which the dynamic wallpaper corresponding to the big-screen home screen scenario is displayed may be preset to 2.5 s. When step S4105 is performed, each frame of wallpaper image of the dynamic wallpaper corresponding to the small-screen home screen scenario is displayed successively in duration of 0.8 s, and then each frame of wallpaper image of the dynamic wallpaper corresponding to the big-screen home screen scenario is displayed successively in duration of 2.5 s.

In some embodiments, after display of the dynamic wallpaper corresponding to the big-screen home screen scenario is completed, a last frame of the dynamic wallpaper corresponding to the big-screen home screen scenario may be always displayed as a wallpaper image on the home screen interface.

For example, as shown in (5) of FIG. 4b, the user places a finger on a fingerprint pattern region on a big-screen lock screen interface, to perform unlock. After unlock succeeds, a home screen interface shown in (6) of FIG. 4b is switched to. An icon 40 of a call application, an icon 41 of a messaging application, an icon 42 corresponding to a browser, and an icon 43 of a camera application are displayed on the home screen interface. A wallpaper with petals on the home screen interface presents continuously changing petal rotation from (6), (7), (8), (9), to (10) of FIG. 4b. (6) and (7) of FIG. 4b are the wallpaper image 34 and wallpaper image 35 of the dynamic wallpaper corresponding to the small screen scenario shown in FIG. 3 respectively. (8), (9), and (10) are the wallpaper image 36, wallpaper image 37, and wallpaper image 38 of the dynamic wallpaper corresponding to the big screen scenario respectively.

It can be seen from FIG. 4b, when the foldable phone performs step S4101 to step S4105, the foldable phone switches from the small screen to the big screen, and an image displayed on the small-screen user interface and an image displayed on the big-screen user interface change continuously. On the user interfaces shown in (1) to (10) of FIG. 4b, the wallpaper image 31 to the wallpaper image 38 that are continuously changed shown in FIG. 3 are successively presented on the user interface, so that wallpaper images seen by the user are continuous. Therefore, continuity of the wallpaper images is not destroyed due to switching between display screens. This brings use experience of smoothly switching between display screens to the user during unfolding of the foldable screen.

For example, a process of step S4105 may be as follows: When a display screen receives an operation of switching from the lock screen scenario to the big-screen home screen scenario, after it is determined that unlock succeeds, the system sends information about scenario switching to the wallpaper app in response to the operation of switching from the lock screen scenario to the big-screen home screen scenario. The super wallpaper module in the wallpaper app receives the information about scenario switching sent by the system. The information is used to indicate that the foldable phone switches from the lock screen scenario to the big-screen home screen scenario. The super wallpaper module determines the dynamic wallpaper corresponding to the small-screen home screen scenario and the dynamic wallpaper corresponding to the big-screen home screen scenario based on the information about scenario switching, and sends the dynamic wallpaper corresponding to the small-screen home screen scenario and the dynamic wallpaper corresponding to the big-screen home screen scenario to the wallpaper play module. The wallpaper play module sends a wallpaper to be displayed to a media codec, and the media codec encodes the wallpaper to be displayed and sends encoded wallpaper data to a GPU. The GPU decodes the encoded wallpaper data, and then pushes a decoded wallpaper to a display screen corresponding to a big screen in the display. The display screen corresponding to the big screen successively displays the dynamic wallpaper corresponding to the small-screen home screen scenario and the dynamic wallpaper corresponding to the big-screen home screen scenario.

Refer to related content in FIG. 2b for working principles of the wallpaper app, the super wallpaper module, the wallpaper play module, the media codec, the display, and the GPU. The details are not described herein again.

It should be noted that, in some other embodiments, after step S4101 to step S4104 are performed, if the user no longer performs the unlock operation, or unlock fails, performing a subsequent step S4105 is not triggered any more. For example, while step S4101 to step S4104 are performed, the foldable phone presents changing as shown from (1), (2), (3), (4), to (5) of FIG. 4b. For details, refer to the foregoing descriptions of (1), (2), (3), (4), and (5) of FIG. 4b. The details are not described herein again.

Figure 4C:
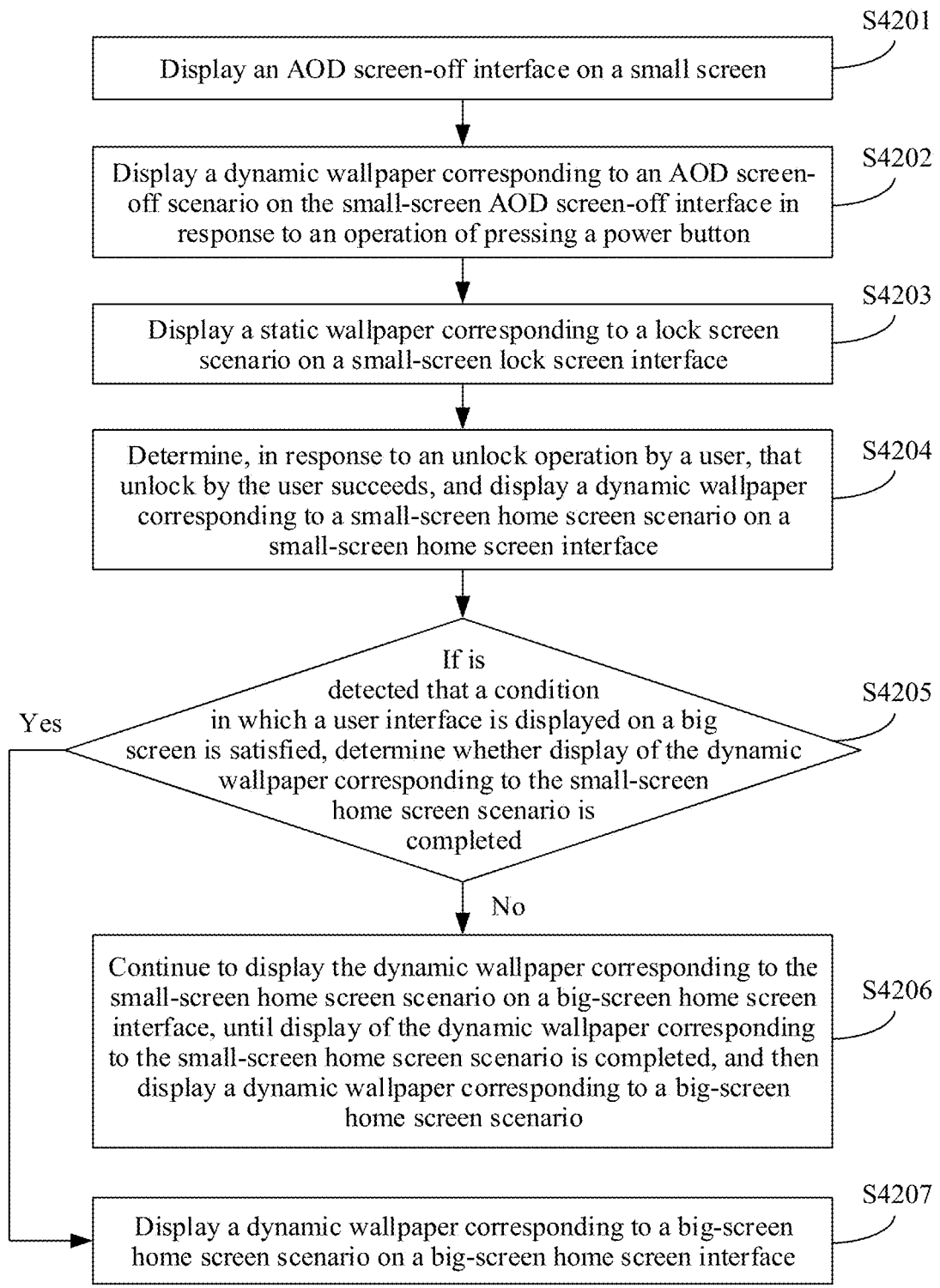
FIG. 4c is a second flowchart of a method for displaying a dynamic wallpaper according to this application.

FIG. 4c is a second flowchart of a method for displaying a dynamic wallpaper according to an embodiment of this application. The method shown in FIG. 4c is applied to the following scenario: a foldable phone switches from a small-screen AOD screen-off scenario to a small-screen lock screen scenario, switches from a small-screen lock screen scenario to a small-screen home screen scenario, and then switches from the small-screen home screen scenario to a big-screen home screen scenario.

The method shown in FIG. 4c is applied to the electronic device proposed in embodiments of this application. In the application scenario, a continuously changing dynamic wallpaper can be displayed based on the pre-configured wallpapers corresponding to a plurality of scenarios proposed in the foregoing embodiments of this application. Taking the foldable phone as an example, steps shown in FIG. 4c are described as follows.

S4201: Display an AOD screen-off interface on a small screen.

No wallpaper image is displayed on the AOD screen-off interface in step S4201. Specifically, refer to step S4101 in FIG. 4a for a process and principle of performing step S4201. The details are not described in this embodiment of this application.

S4202: Display a dynamic wallpaper corresponding to the AOD screen-off scenario on a small-screen AOD screen-off interface in response to an operation of pressing a power button.

Specifically, refer to step S4102 in FIG. 4a for a process and principle of performing step S4202. The details are not described in this embodiment of this application.

S4203: Display a static wallpaper corresponding to the lock screen scenario on a small-screen lock screen interface.

Specifically, refer to step S4103 in FIG. 4a for a process and principle of performing step S4203. The details are not described in this embodiment of this application.

S4204: Determine, in response to an unlock operation by a user, that the user has performed unlock successfully, and display a dynamic wallpaper corresponding to a small-screen home screen scenario on a small-screen home screen interface.

In step S4204, if the foldable phone receives the unlock operation and determines that the user has performed unlock successfully, switch to the small-screen home screen interface is triggered, and the dynamic wallpaper corresponding to the small-screen home screen scenario is displayed on the small-screen home screen interface.

There is a plurality of unlock operations by the user, such as unlock by face recognition, unlock by entering a password, unlock by sliding, or the like. The unlock operations by the user mentioned in this embodiment of this application is only an example of a trigger operation to trigger the foldable phone to switch from the lock screen scenario to the home screen scenario. A specific manner in which switching from the lock screen interface to the home screen interface is triggered is not limited in this embodiment of this application.

Figure 4D:
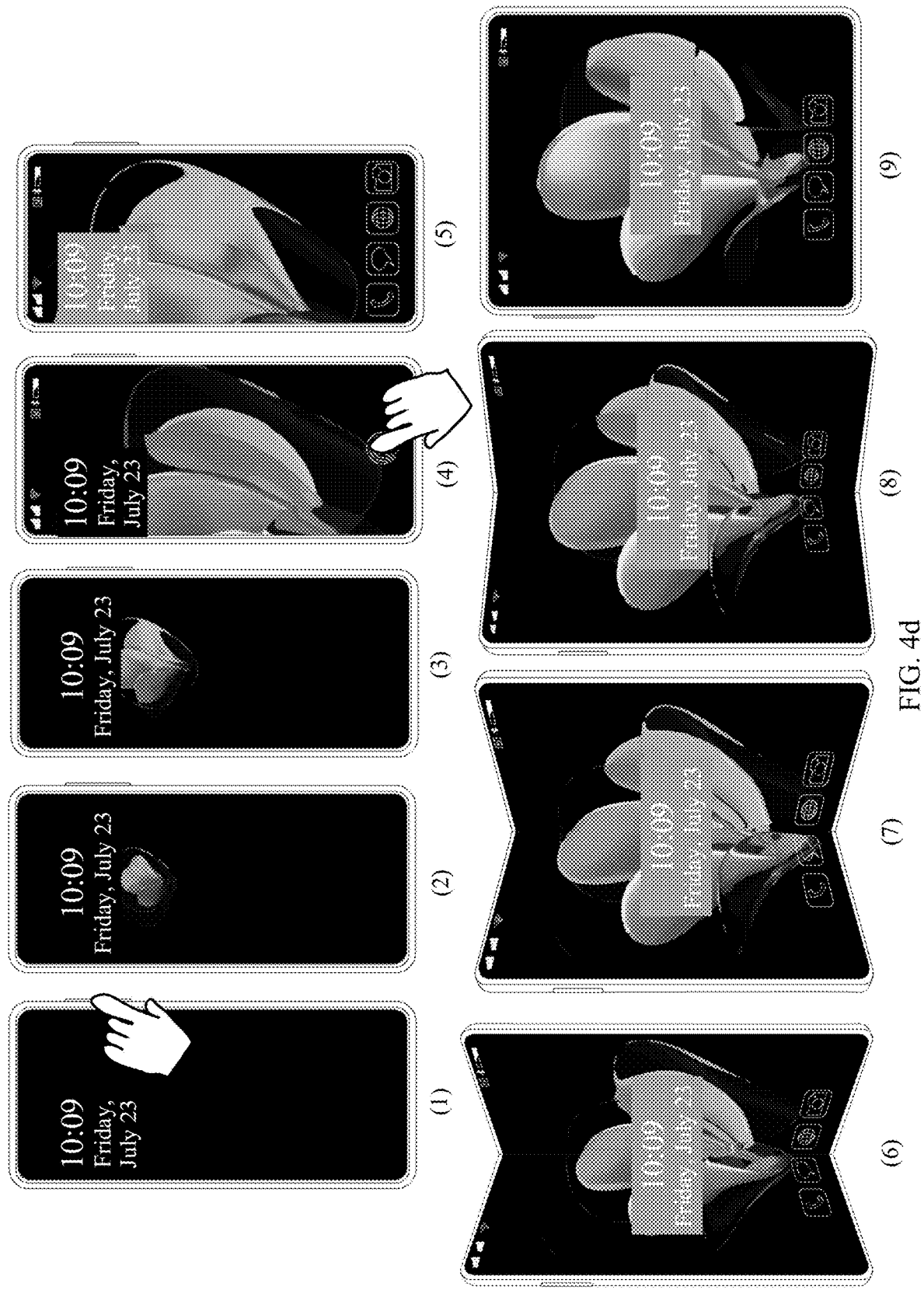
FIG. 4d is a third schematic diagram of an interface change of a foldable phone during unfolding of a foldable screen according to this application.

For example, a power button is pressed on an AOD screen-off interface shown in (1) of FIG. 4d, and the foldable phone is triggered to perform step S4201 to step S4204. Further, an interface shown in (1) of FIG. 4d is changed to an interface shown in (2) of FIG. 4d. Specifically, the dynamic wallpaper corresponding to the AOD screen-off scenario displayed on the AOD screen-off interface presents a dynamic change, and is changed from (2) of FIG. 4d and (3) of FIG. 4d. Finally, a small-screen lock screen interface shown in (4) of FIG. 4d is switched to. When a user performs fingerprint unlock on the interface shown in (4) of FIG. 4d, after unlock succeeds, a home screen interface shown in (5) of FIG. 4d is switched to. A dynamic wallpaper corresponding to a home screen scenario is displayed on the home screen interface. (2) of FIG. 4d is the wallpaper image 31 of the dynamic wallpaper corresponding to the AOD screen-off scenario mentioned in FIG. 3. (3) of FIG. 4d is the wallpaper image 32 of the dynamic wallpaper corresponding to the AOD screen-off scenario shown in FIG. 3. (4) of FIG. 4d is an image of a right half region of the dynamic wallpaper image 33 corresponding to the lock screen scenario. (5) of FIG. 4d is the wallpaper image 34 of the dynamic wallpaper corresponding to the small-screen home screen scenario. It can be seen from (2), (3), (4), and (5) of FIG. 4d that wallpapers are continuously changing.

For example, a process of step S4204 may be as follows: when a display screen receives an operation of switch from the lock screen scenario to the small-screen home screen scenario, after it is determined that unlock succeeds, a system sends information about scenario switching to a wallpaper app in response to the operation of switch from the lock screen scenario to the small-screen home screen scenario. A super wallpaper module in the wallpaper app receives the information about scenario switching sent by the system, to indicate that the foldable phone switches from the lock screen scenario to the small-screen home screen scenario. The super wallpaper module determines the dynamic wallpaper corresponding to the small-screen home screen scenario based on the information about scenario switch, and sends the dynamic wallpaper corresponding to the small-screen home screen scenario and a dynamic wallpaper corresponding to a big-screen home screen scenario to the wallpaper play module. The wallpaper play module sends a wallpaper to be displayed to a media codec, and the media codec encodes the wallpaper to be displayed and sends encoded wallpaper data to a GPU. The GPU decodes the encoded wallpaper data, and then pushes a decoded wallpaper to a display screen corresponding to a small screen in a display. The display screen corresponding to the small screen displays the dynamic wallpaper corresponding to the small-screen home screen scenario.

Refer to related content in FIG. 2b for working principles of the wallpaper app, the super wallpaper module, the wallpaper play module, the media codec, the display, and the GPU. The details are not described herein again.

S4205: If is detected that a condition in which a user interface is displayed on a big screen is satisfied, determine whether display of the dynamic wallpaper corresponding to the small-screen home screen scenario is completed.

Specifically, when the user unfolds a foldable screen of the foldable phone, the foldable phone detects that the condition in which a user interface is displayed on a big screen is satisfied currently, and then switches a screen for currently displaying the home screen interface from a small screen to a big screen, and continues to display the home screen interface on the big screen.

The condition in which a user interface is displayed on a big screen is satisfied may be that a folding angle x is greater than a second preset angle, and the condition in which a user interface is displayed on a big screen is satisfied may also be set as another condition. The condition in which a user interface is displayed on a big screen is satisfied is not limited in this embodiment of this application.

When the big screen is switched to for displaying the home screen interface, in some cases, the user unfolds the foldable screen relatively fast. When all wallpaper images of the dynamic wallpaper corresponding to the small-screen home screen scenario are not displayed on a small-screen home screen, the big-screen home screen scenario is switched to immediately. To ensure that an image of the dynamic wallpaper corresponding to the small-screen home screen scenario displayed on the small-screen home screen interface in step S4204 can be continuous with an image of a dynamic wallpaper displayed on the big-screen home screen, it may be determined first whether display of the dynamic wallpaper corresponding to the small-screen home screen scenario is completed or not. Further, a manner in which the dynamic wallpaper on a big-screen home screen interface is displayed may be determined based on a determined result.

Specifically, it can be known, from the foregoing introduction to the pre-configured dynamic wallpapers corresponding to a plurality of scenarios, that the dynamic wallpaper corresponding to the small-screen home screen scenario may include a plurality of frames of continuously changing wallpaper images. When each frame of continuously changing wallpaper image of the dynamic wallpaper corresponding to the small-screen home screen scenario is displayed on the small-screen home screen interface, it can be determined that display of the dynamic wallpaper corresponding to the small-screen home screen scenario is completed. When there is still at least one frame of wallpaper image of the dynamic wallpaper that is corresponding to the small-screen home screen scenario and that is not displayed on the small-screen home screen interface, it is considered that display of the dynamic wallpaper corresponding to the small-screen home screen scenario is still not completed. The dynamic wallpaper corresponding to the small-screen home screen scenario is still to be displayed when the big-screen home screen interface is switched to.

For example, a manner in which whether display of the dynamic wallpaper corresponding to the small-screen home screen scenario is completed or not is determined as follows: An $n^{th}$ frame that is currently displayed and that is of the dynamic wallpaper corresponding to the small-screen home screen scenario is read. If n is less than a total quantity N of frames of the dynamic wallpaper corresponding to the small-screen home screen scenario, it is determined that display of the dynamic wallpaper corresponding to the small-screen home screen scenario is not completed. If n is equal to N, it is determined that display of the dynamic wallpaper corresponding to the small-screen home screen scenario is completed.

In some other embodiments, it is determined whether play of a video of the dynamic wallpaper corresponding to the small-screen home screen scenario is completed. If play of the video of the dynamic wallpaper corresponding to the small-screen home screen scenario is not completed, it is determined that display of the dynamic wallpaper corresponding to the small-screen home screen scenario is not completed. If play of the video of the dynamic wallpaper corresponding to the small-screen home screen scenario is completed, it is determined that display of the dynamic wallpaper corresponding to the small-screen home screen scenario is completed.

When it is determined that display of the dynamic wallpaper corresponding to the small-screen home screen scenario is not completed, step S4206 is to be performed, to ensure continuity of wallpaper images during switching to the big-screen for displaying the home screen interface. When it is determined that display of the dynamic wallpaper corresponding to the small-screen home screen scenario is completed, step S4207 is performed.

S4206: Continue to display the dynamic wallpaper corresponding to the small-screen home screen scenario on the big-screen home screen interface, until display of the dynamic wallpaper corresponding to the small-screen home screen scenario is completed, and then display the dynamic wallpaper corresponding to the big-screen home screen scenario.

The continuing to display the dynamic wallpaper corresponding to the small-screen home screen scenario on the big-screen home screen interface can be understood as continuing to display a wallpaper image that is not displayed and that is of the dynamic wallpaper corresponding to the small-screen home screen scenario.

For example, the dynamic wallpaper corresponding to the small-screen home screen scenario may be a wallpaper video corresponding to the small-screen home screen scenario, and step S4206 may be performed in the following manner: If it is detected in step S4205 that the condition in which a user interface is displayed on a big screen is satisfied, display of a wallpaper video that is corresponding to the small-screen home screen scenario and that is being played on the small screen interface may be paused, until the big screen is switched to for displaying the home screen interface, and then the wallpaper video corresponding to the small-screen home screen scenario can be continually played. After play of the wallpaper video corresponding to the small-screen home screen scenario is completed, a wallpaper video corresponding to the big-screen home screen scenario is played on the big-screen home screen interface.

For example, the dynamic wallpaper corresponding to the small-screen home screen scenario may be a dynamic image corresponding to the small-screen home screen scenario. Step S4206 may be performed in the following manner: if it is detected in step S4205 that the condition in which a user interface is displayed on a big screen is satisfied, it is recorded that an $n^{th}$ frame of dynamic image corresponding to the small-screen home screen scenario is displayed on the small-screen home screen interface currently. When the big screen is switched to for displaying the home screen interface, display starts from an $(n+1)^{th}$ frame of wallpaper image of the dynamic image corresponding to the small-screen home screen scenario on the big-screen home screen interface, until display of all wallpaper images of the dynamic image corresponding to the small-screen home screen scenario is completed, and then the dynamic wallpaper corresponding to the big-screen home screen scenario is displayed.

For example, if the dynamic wallpaper corresponding to the small-screen home screen scenario has a total of 20 frames of continuously changing wallpaper images, and it is detected in step S4205 that the condition in which a user interface is displayed on a big screen is satisfied, a $10^{th}$ frame of wallpaper image of the dynamic wallpaper corresponding to the small-screen home screen scenario is displayed on the small-screen home screen interface. Therefore, after the big screen is switched to for displaying the home screen interface, an $11^{th}$ frame of wallpaper image to a $20^{th}$ frame of wallpaper image of the dynamic wallpaper corresponding to the small-screen home screen scenario are continually displayed on the big-screen home screen interface. After the $20^{th}$ frame of wallpaper image corresponding to the small-screen home screen scenario is displayed, the dynamic wallpaper corresponding to the big-screen home screen scenario is displayed.

In some embodiments, to prevent a dynamic effect presented by the wallpaper on a big-screen home screen from lasting for an excessively long time, preset duration in which the dynamic wallpaper is displayed on the big-screen home screen during switching to the big-screen home screen interface may be preset. Afterwards, by adjusting a rate at which wallpaper images are displayed, some wallpaper images of the dynamic wallpaper corresponding to the small-screen home screen scenario and the dynamic wallpaper corresponding to the big-screen home screen scenario are displayed within the preset duration in which the dynamic wallpaper is displayed on the big-screen home screen. For example, the preset duration in which the dynamic wallpaper is displayed on the big-screen home screen may be preset to 2.3 s.

For example, still refer to FIG. 4d. When the small-screen home screen interface shown in (5) of FIG. 4d is unfolded to a big-screen home interface shown in (6) of FIG. 4d, all wallpaper images of the dynamic wallpaper corresponding to the small-screen home screen scenario are not displayed on the small-screen home screen, and the big screen is switched to. Therefore, a wallpaper image of the dynamic wallpaper corresponding to the small-screen home screen scenario is still displayed on the big-screen home screen interface in (6) of FIG. 4d. A wallpaper in (5) of FIG. 4d is the wallpaper image 34 corresponding to the small-screen home screen scenario shown in FIG. 3. A wallpaper in (6) of FIG. 4d is the wallpaper image 35 corresponding to the small-screen home screen scenario shown in FIG. 3. It can be seen from (5) of FIG. 4d and (6) of FIG. 4d that, although the home screen interface is displayed from the small screen to the big screen, a change of the wallpaper on the home screen interface is still continuous. When the big-screen home screen interface has displayed the dynamic wallpaper corresponding to the small-screen home screen scenario, as shown in (7), (8), and (9) of FIG. 4d, the big-screen home screen interface continues to display the dynamic wallpaper corresponding to the big-screen home screen scenario. (7) of FIG. 4d is the wallpaper image 36 corresponding to the big-screen home screen scenario shown in FIG. 3. (8) of FIG. 4d is the wallpaper image 37 corresponding to the big-screen home screen scenario shown in FIG. 3. (9) of FIG. 4d is the wallpaper image 38 corresponding to the big-screen home screen scenario shown in FIG. 3.

In some other embodiments, a display progress of the dynamic wallpaper on the big-screen home screen interface may be associated with a hinge angle. For example, a play progress of each frame of wallpaper image displayed on the big-screen home screen interface may also be changed as the hinge angle is changed. For example, when the hinge angle x is not changed, a wallpaper image displayed on the dynamic wallpaper is not changed, and play of a video of the dynamic wallpaper stops. When the hinge angle is unfolded to 180°, play of the video of the dynamic wallpaper is completed, that is, a last frame of image of the dynamic wallpaper corresponding to the big-screen home screen scenario is played.

For example, step S4205 and step S4206 may be performed as follows: when the wallpaper app listens to, through a sensor interface, a hinge angle collected by a hinge angle sensor, and detects, based on the hinge angle, that a condition in which a user interface is displayed on a big screen is satisfied, the wallpaper app sends the dynamic wallpaper corresponding to the big-screen home screen scenario to a media codec after detecting that the dynamic wallpaper corresponding to the small-screen home screen scenario is displayed. The media codec encodes the dynamic wallpaper corresponding to the big-screen home screen scenario and sends encoded wallpaper data to the GPU. The GPU decodes the encoded wallpaper data, and then pushes a decoded wallpaper to a display screen corresponding to a big screen in a display. The display screen corresponding to a small screen displays the dynamic wallpaper corresponding to the big-screen home screen scenario.

Refer to related content in FIG. 2b for working principles of the wallpaper app, the media codec, the display, and the GPU. The details are not described herein again.

S4207: Display the dynamic wallpaper corresponding to the big-screen home screen scenario on the big-screen home screen interface.

Because it is determined that display of the dynamic wallpaper corresponding to the small-screen home screen scenario is completed in the foregoing step S4205, during switching to the big screen for displaying the home screen interface, only the dynamic wallpaper corresponding to the big-screen home screen scenario is played. That is, continuity of the wallpaper image may be achieved.

For example, step S4205 to step S4207 may be performed as follows: when the wallpaper app listens to, through the sensor interface, the hinge angle collected by the hinge angle sensor, and detects, based on the hinge angle, that the condition in which a user interface is displayed on a big screen is satisfied, the wallpaper app sends the dynamic wallpaper corresponding to the big-screen home screen scenario to the media codec. The media codec encodes the dynamic wallpaper corresponding to the big-screen home screen scenario and sends encoded wallpaper data to the GPU. The GPU decodes the encoded wallpaper data, and then pushes a decoded wallpaper to a display screen corresponding to a big screen in a display. The display screen corresponding to a big screen displays the dynamic wallpaper corresponding to the big-screen home screen scenario.

Refer to related content in FIG. 2b for working principles of the wallpaper app, the media codec, the display, and the GPU. The details are not described herein again.

Figure 4E:
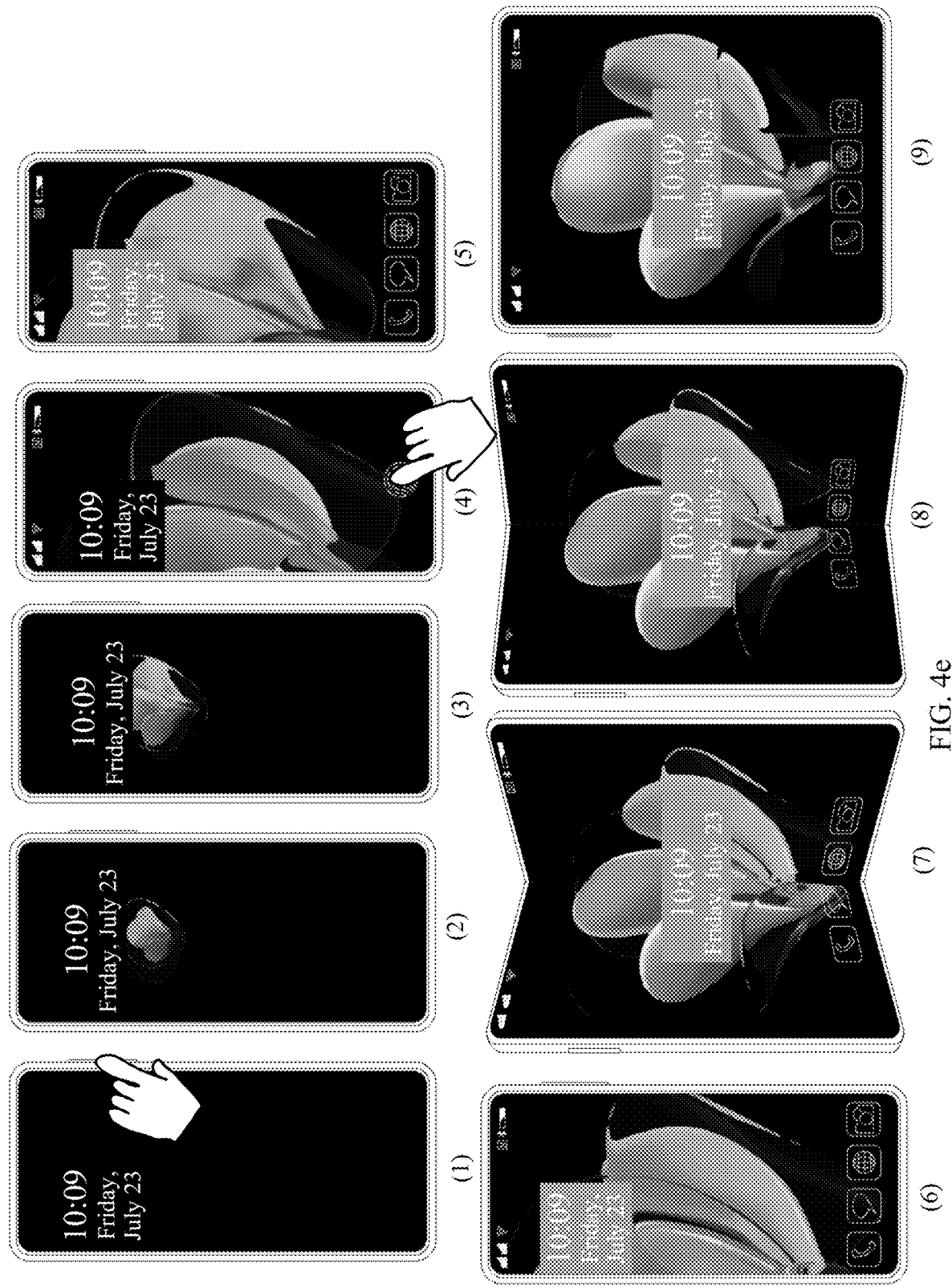
FIG. 4e is a fourth schematic diagram of an interface change of a foldable phone during unfolding of a foldable screen according to this application.

For example, for (1), (2), (3), (4), and (5) of FIG. 4e, refer to foregoing content of (1), (2), (3), (4), and (5) of FIG. 4d. After (5) of FIG. 4e shows a small-screen home screen interface, a dynamic wallpaper displayed on the small-screen home screen interface continuously changes to (6) of FIG. 4e, and display of the dynamic wallpaper corresponding to the small-screen home screen scenario is completed. Afterwards, the user unfolds the foldable phone from (6) of FIG. 4e. After the foldable phone detects that the condition in which a user interface is displayed on a big screen is satisfied, the big-screen home screen interface is switched to for display, and the dynamic wallpaper corresponding to the big-screen home screen scenario is displayed on the big-screen home screen interface. A process of changes of the dynamic wallpaper corresponding to the big-screen home screen scenario is shown in (7), (8), and (9) of FIG. 4e. (6) of FIG. 4e is the wallpaper image 35 corresponding to the small-screen home screen scenario. (7) of FIG. 4e is the wallpaper image 36 corresponding to the small-screen home screen scenario. (8) of FIG. 4e is the wallpaper image 37 corresponding to the small-screen home screen scenario. (9) of FIG. 4e is the wallpaper image 38 corresponding to the small-screen home screen scenario. It can be seen from (1) to (9) of FIG. 4e that, during switching from the small screen to the big screen, displayed wallpaper images always change continuously, and the displayed wallpaper images do not change discontinuously.

For example, in some embodiments, when the foldable phone is in the big-screen home screen scenario, a display progress of the dynamic wallpaper may be positively related to the hinge angle. For example, a wallpaper image corresponding to the hinge angle may be pre-configured. For example, the wallpaper image 36 corresponding to the big-screen home screen scenario in FIG. 3 is displayed when the hinge angle is 90°, the wallpaper image 37 corresponding to the big-screen home screen scenario in FIG. 3 is displayed when the hinge angle is 120°, and the wallpaper image 38 corresponding to the big-screen home screen scenario in FIG. 3 is displayed when the hinge angle is 180°.

For example, when step S4206 or step S4207 is performed, a wallpaper folding module in the wallpaper app can listen to, through the sensor interface, the hinge angle collected by the hinge angle sensor. When it is determined, based on the obtained hinge angle by listening, that a display screen is in a folded state, a wallpaper folding process is performed. That is, a corresponding image of a dynamic wallpaper is determined based on a change of the hinge angle, and the determined image is sent to the wallpaper play module. The wallpaper play module triggers the display screen for play.

Refer to the foregoing related content in FIG. 2b for working principles of the wallpaper app, the super wallpaper module, the wallpaper play module, the wallpaper folding module, the media codec, the display, and the GPU. The details are not described herein again.

Figure 4F:
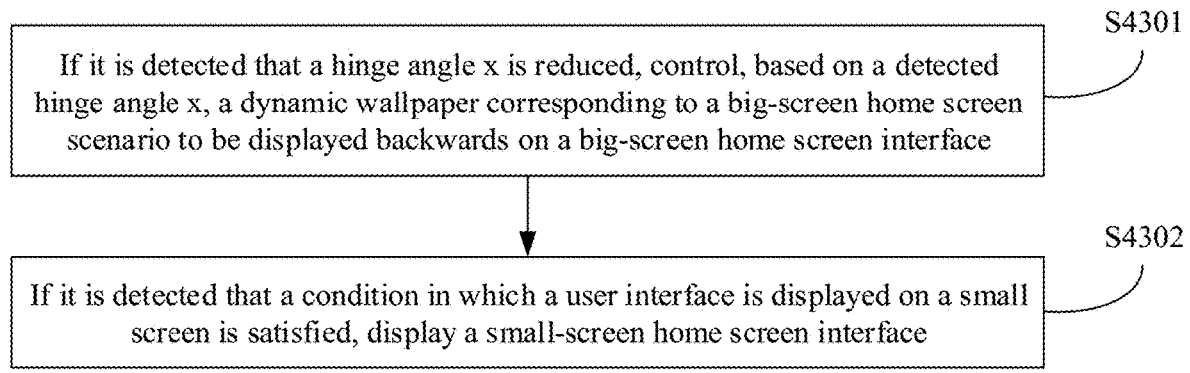
FIG. 4f is a third flowchart of a method for displaying a dynamic wallpaper according to this application.

FIG. 4f is a third flowchart of a method for displaying a dynamic wallpaper according to an embodiment of this application. The method shown in FIG. 4f is applied to the following scenario: a foldable phone switches from a big-screen home screen scenario to a small-screen home screen scenario.

The method shown in FIG. 4f is applied to the electronic device proposed in embodiments of this application. In the application scenario, a continuously changing dynamic wallpaper can be displayed based on the pre-configured wallpapers corresponding to a plurality of scenarios proposed in the foregoing embodiments of this application. Taking the foldable phone as an example, steps shown in FIG. 4f are described as follows.

S4301: If it is detected that a hinge angle x is reduced, control, based on the detected hinge angle x, a dynamic wallpaper corresponding to the big-screen home screen scenario to be displayed backwards on a big-screen home screen interface.

In some embodiments, the hinge angle x is associated with a display progress of the dynamic wallpaper corresponding to the big-screen home screen scenario. For example, a play progress of each frame of wallpaper image displayed on the big-screen home screen interface may also be changed as the hinge angle is changed. For example, when the hinge angle x is not changed, a wallpaper image displayed on the dynamic wallpaper is not changed, and play of a video of the dynamic wallpaper stops. When the hinge angle is unfolded from 0° to 180°, play of a video of the dynamic wallpaper is completed, that is, a last frame of image of the dynamic wallpaper corresponding to the big-screen home screen scenario is played. When the hinge angle is folded from 180° to 0°, the dynamic wallpaper corresponding to the big-screen home screen scenario is triggered to be displayed backwards. That is, a last frame of the dynamic wallpaper corresponding to the big-screen home screen scenario is displayed backward to a first frame of the dynamic wallpaper corresponding to the big-screen home screen scenario. A value of the hinge angle x controls a progress of backward display of the dynamic wallpaper.

Specifically, an association relationship between the hinge angle x and the display progress of the dynamic wallpaper corresponding to the big-screen home screen scenario is not limited in this embodiment of this application.

For example, when step S4301 is performed, a wallpaper folding module in a wallpaper app can listen to, through a sensor interface, a hinge angle collected by a hinge angle sensor. When it is determined, based on the obtained hinge angle by listening, that a display screen is in a folded state, a wallpaper folding process is performed. A corresponding image of the dynamic wallpaper is determined based on a change of the hinge angle, and the determined image is sent to a wallpaper play module. The wallpaper play module triggers a display screen for play.

Refer to the foregoing related content in FIG. 2b for working principles of the wallpaper app, the super wallpaper module, the wallpaper play module, the wallpaper folding module, the media codec, the display, and the GPU. The details are not described herein again.

Figure 4G:
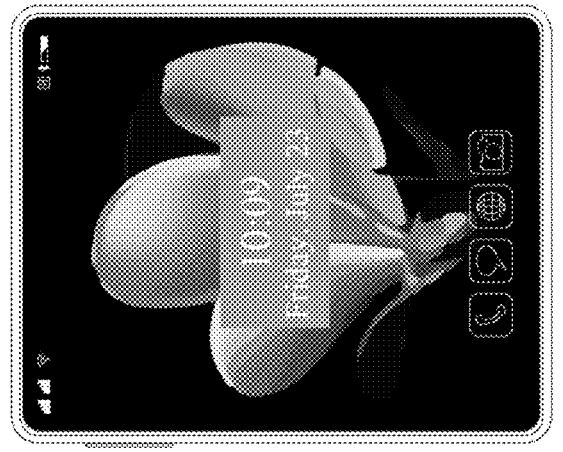
FIG. 4g is a first schematic diagram of an interface change of a foldable phone during folding of a foldable screen according to this application.
Figure 4G:
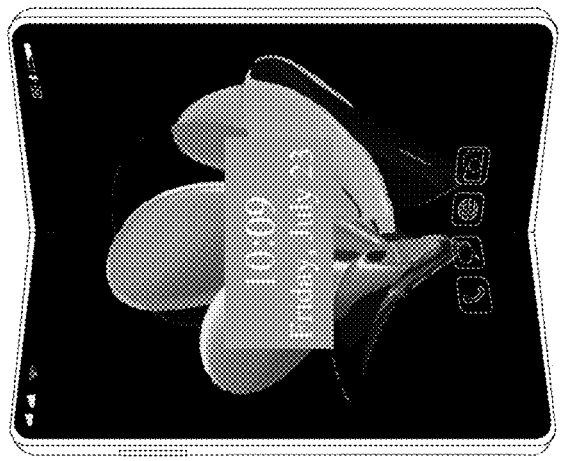
Figure 4G:
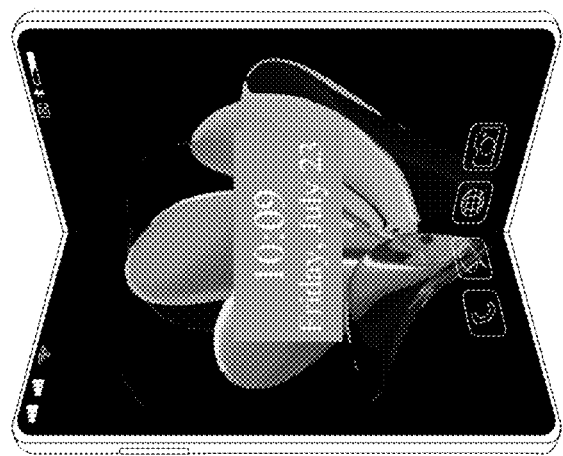
Figure 4G:
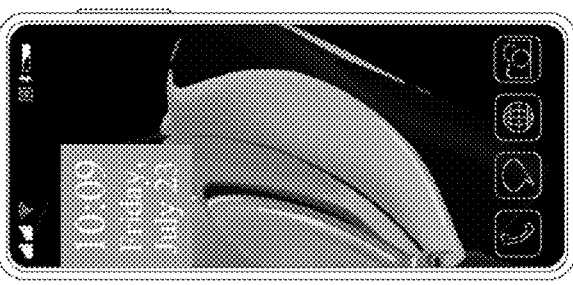

For example, as shown in FIG. 4g, when a user folds the foldable phone from an unfolded big screen form shown in (1) of FIG. 4g, it can be seen that as a folding angle is reduced, images of a dynamic wallpaper starts changing from (1) of FIG. 4g to (2) of FIG. 4g, and from (2) of FIG. 4g to (3) of FIG. 4g. (1) of FIG. 4g is the wallpaper 38 corresponding to the big-screen home screen scenario shown in FIG. 3. (2) of FIG. 4g is the wallpaper 37 corresponding to the big-screen home screen scenario shown in FIG. 3. (3) of FIG. 4g is the wallpaper 36 corresponding to the big-screen home screen scenario shown in FIG. 3. It can be seen that in (1), (2), and (3) of FIG. 4g, a process of backward display of the dynamic wallpaper corresponding to the big-screen home screen scenario is displayed on a home screen interface.

S4302: Display a small-screen home screen interface if it is detected that a condition in which a user interface is displayed on a small screen is satisfied.

When a foldable screen is folded until the condition in which a user interface is displayed on a small screen is satisfied, the small screen is switched to for continually displaying the home screen interface. A last frame of wallpaper image of the dynamic wallpaper corresponding to the small-screen home screen scenario is statically displayed on the small-screen home screen interface.

In step S4302, the dynamic wallpaper corresponding to the big-screen home screen scenario is displayed backwards from a last frame of wallpaper image to a first frame of wallpaper image. It can be known, from the foregoing description of the pre-configured wallpapers corresponding to a plurality of scenarios, that the first frame of wallpaper image of the dynamic wallpaper corresponding to the big-screen home screen scenario and the last frame of wallpaper image corresponding to the small-screen home screen scenario should be continuous images. Therefore, during switching from the big screen to the small screen for display, displayed wallpaper images are still continuous.

As shown in FIG. 4g, the foldable screen is continually folded from a folded screen form shown in (3) of FIG. 4g, until the foldable screen is folded in a form shown in (4) of FIG. 4b. Then the small screen is switched to for displaying the home screen interface. A wallpaper image shown in (4) of FIG. 4g is a right half image of the wallpaper image 35 corresponding to the small-screen home screen scenario in FIG. 3. An image displayed in (3) of FIG. 4g is continuous with the image displayed in (4) of FIG. 4g.

(2) Small Screen Scenario

Figure 5A:
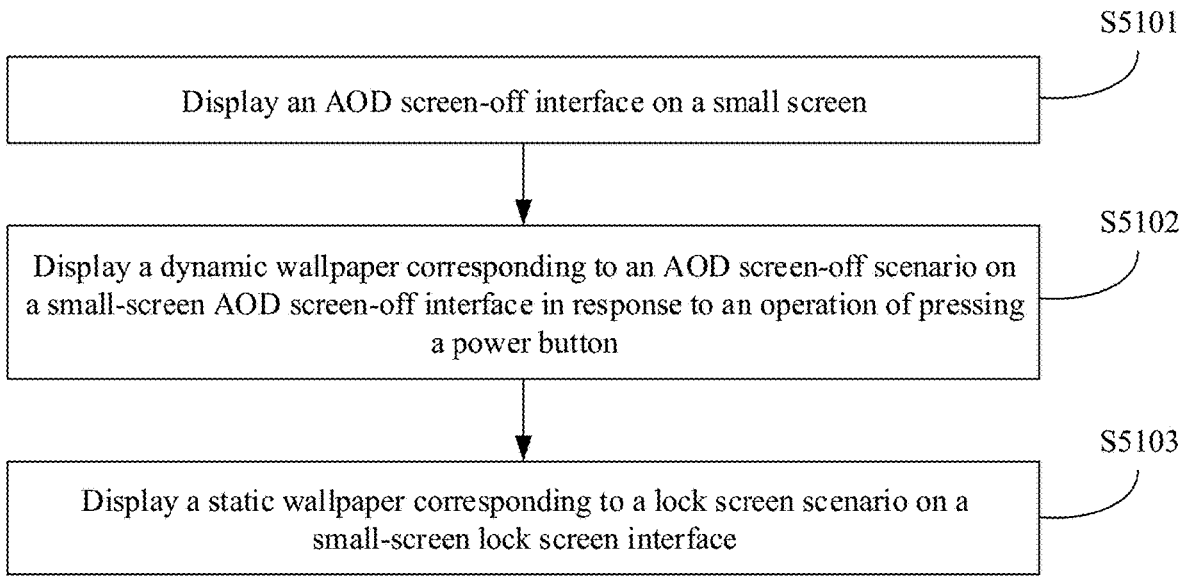
FIG. 5a is a fourth flowchart of a method for displaying a dynamic wallpaper according to this application.

FIG. 5a is a fourth flowchart of a method for displaying a dynamic wallpaper according to an embodiment of this application. The method shown in FIG. 5a is applied to the following scenario: a foldable phone switches from a small-screen AOD screen-off scenario to a small-screen lock screen scenario.

The method shown in FIG. 5a is applied to the electronic device proposed in embodiments of this application. In the application scenario, a continuously changing dynamic wallpaper can be displayed based on the pre-configured wallpapers corresponding to a plurality of scenarios proposed in the foregoing embodiments of this application. Taking the foldable phone as an example, steps shown in FIG. 5a are described as follows.

S5101: Display an AOD screen-off interface on a small screen.

Refer to the foregoing step S4101 in FIG. 4a for a process and principle of step S5101. The details are not described herein again.

S5102: Display a dynamic wallpaper corresponding to the AOD screen-off scenario on a small-screen AOD screen-off interface in response to an operation of pressing a power button.

Refer to the foregoing step S4102 in FIG. 4a for a process and principle of step S5102. The details are not described herein again.

S5103: Display a static wallpaper corresponding to the lock screen scenario on a small-screen lock screen interface.

Refer to the foregoing step S4103 in FIG. 4a for a process and principle of step S5103. The details are not described herein again.

For example, when the foldable phone performs step S5101 to step S5103, a small-screen user interface of the foldable phone presents changes as shown in (1), (2), (3), and (4) of FIG. 4b. For details, refer to the foregoing related descriptions of (1), (2), (3), and (4) of FIG. 4b. The details are not described herein again.

In the application scenario of FIG. 5a, because the dynamic wallpaper corresponding to the AOD screen-off scenario and the static wallpaper corresponding to the lock screen scenario are displayed successively on the small-screen user interface, and it can be known, from the foregoing description of the pre-configured wallpapers corresponding to a plurality of scenarios, that the dynamic wallpaper corresponding to the AOD screen-off scenario and the static wallpaper corresponding to the lock screen scenario are continuously changed, during switching from the small-screen AOD screen-off scenario to the small-screen lock screen scenario in FIG. 5a, wallpaper images are continuously changed. This brings a dynamic effect to the user and provides novel and interesting experience to the user.

Figure 5B:
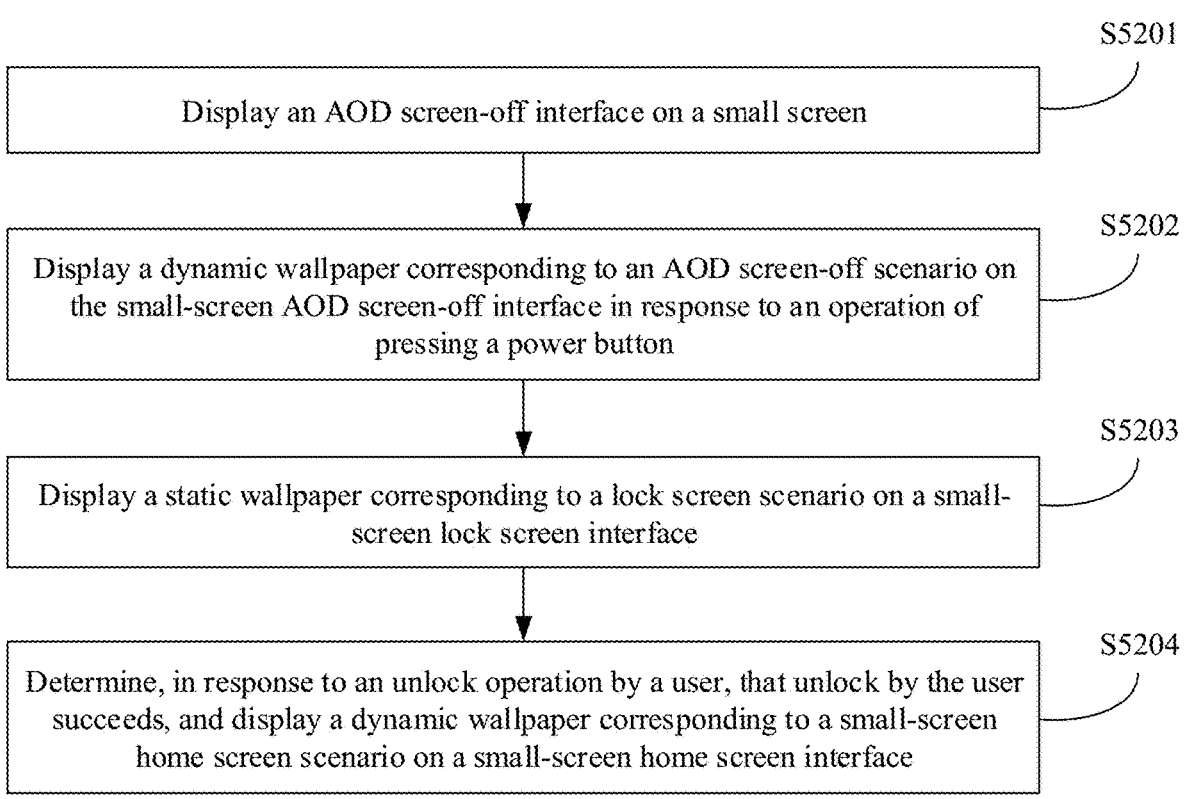
FIG. 5b is a fifth flowchart of a method for displaying a dynamic wallpaper according to this application.

FIG. 5b is a fifth flowchart of a method for displaying a dynamic wallpaper according to an embodiment of this application. The method shown in FIG. 5b is applied to the following scenario: a foldable phone switches from a small-screen AOD screen-off scenario to a small-screen lock screen scenario, and then switches from the small-screen lock screen scenario to a small-screen home screen scenario.

The method shown in FIG. 5b is applied to the electronic device proposed in embodiments of this application. In the application scenario, a continuously changing dynamic wallpaper can be displayed based on the pre-configured wallpapers corresponding to a plurality of scenarios proposed in the foregoing embodiments of this application. Taking the foldable phone as an example, steps shown in FIG. 5b are described as follows.

S5201: Display an AOD screen-off interface on a small screen.

Refer to the foregoing step S5101 in FIG. 5a for a process and principle of step S5201. The details are not described herein again.

S5202: Display a dynamic wallpaper corresponding to an AOD screen-off scenario on a small-screen AOD screen-off interface in response to an operation of pressing a power button.

Refer to the foregoing step S5201 in FIG. 5a for a process and principle of step S5202. The details are not described herein again.

S5203: Display a static wallpaper corresponding to a lock screen scenario on a small-screen lock screen interface.

Refer to the foregoing step S5103 in FIG. 5a for a process and principle of step S5203. The details are not described herein again.

S5204: Determine, in response to an unlock operation by a user, that the user has performed unlock successfully, and display a dynamic wallpaper corresponding to a small-screen home screen scenario on a small-screen home screen interface.

Refer to the foregoing step S4204 in FIG. 4c for a process and principle of step S5204. The details are not described herein again.

When a last frame of wallpaper image of the dynamic wallpaper corresponding to the small-screen home screen scenario is displayed on the small-screen home screen interface, the small-screen home screen interface may still display the last frame of wallpaper image, and does not change a displayed wallpaper image, by the time that another scenario is triggered to be switched to, and then a wallpaper corresponding to the another scenario is played.

For example, when the foldable phone performs step S5201 and S5202, a small-screen display interface of the foldable phone can present changes as shown in (1), (2), (3), (4), (5), and (6) of FIG. 4e. For details, refer to the foregoing description of FIG. 4e. The details are not described herein again.

In the application scenario of FIG. 5b, because the dynamic wallpaper corresponding to the AOD screen-off scenario, the static wallpaper corresponding to the lock screen scenario, and the dynamic wallpaper corresponding to the small-screen home screen scenario are displayed successively on the small-screen user interface, and it can be known, from the foregoing description of the pre-configured wallpapers corresponding to a plurality of scenarios, that the dynamic wallpaper corresponding to the AOD screen-off scenario, the static wallpaper corresponding to the lock screen scenario, and the dynamic wallpaper corresponding to the small-screen home screen scenario are continuously changed, during switching from the small-screen AOD screen-off scenario to the small-screen lock screen scenario, and switch from the small-screen lock screen scenario to the small-screen home screen scenario in FIG. 5b, wallpaper images are continuously changed. This brings a dynamic effect to the user and provides novel and interesting experience to the user.

(3) Big Screen Scenario

Figure 6A:
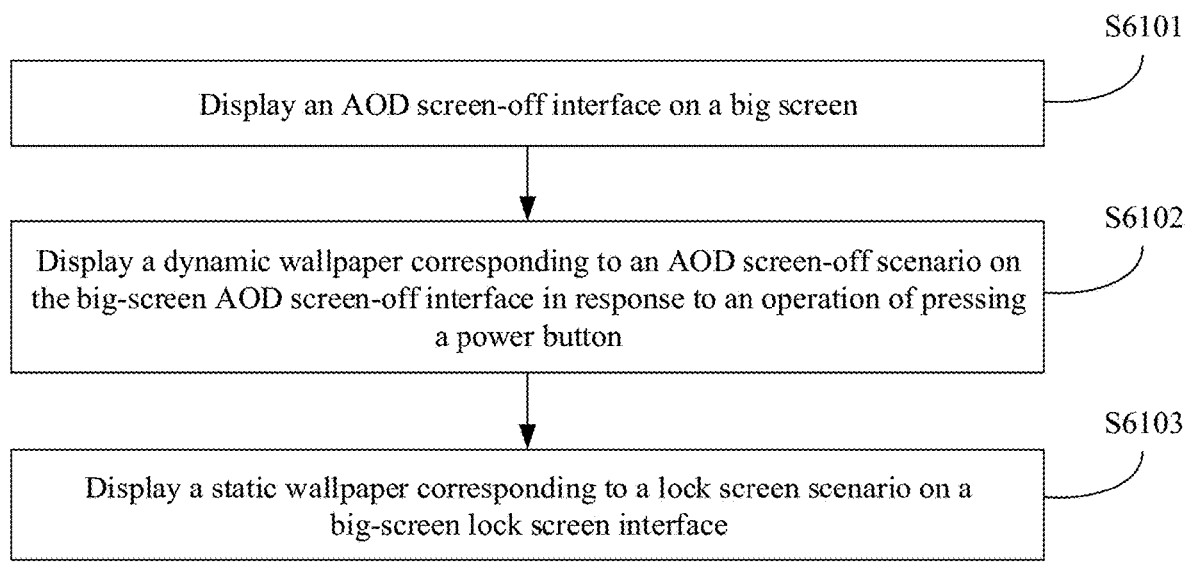
FIG. 6a is a sixth flowchart of a method for displaying a dynamic wallpaper according to this application.

FIG. 6a is a sixth flowchart of a method for displaying a dynamic wallpaper according to an embodiment of this application. The method shown in FIG. 6a is applied to the following scenario: a foldable phone is unfolded into a big screen, and switches from a big-screen AOD screen-off scenario to a big-screen lock screen scenario.

The method shown in FIG. 6a is applied to the electronic device proposed in embodiments of this application. In the application scenario, a continuously changing dynamic wallpaper can be displayed based on the pre-configured wallpapers corresponding to a plurality of scenarios proposed in the foregoing embodiments of this application. Taking the foldable phone as an example, steps shown in FIG. 6a are described as follows.

S6101: Display an AOD screen-off interface on a big screen.

The AOD screen-off interface does not display any wallpaper.

Refer to the foregoing step S5101 in FIG. 5a for a process and principle in step S6101. A difference is that screens for displaying a user interface are different. In step S5101, the small screen is used to display the AOD screen-off interface, while in step S6101, the big screen is used to display the AOD screen-off interface.

Figure 6B:
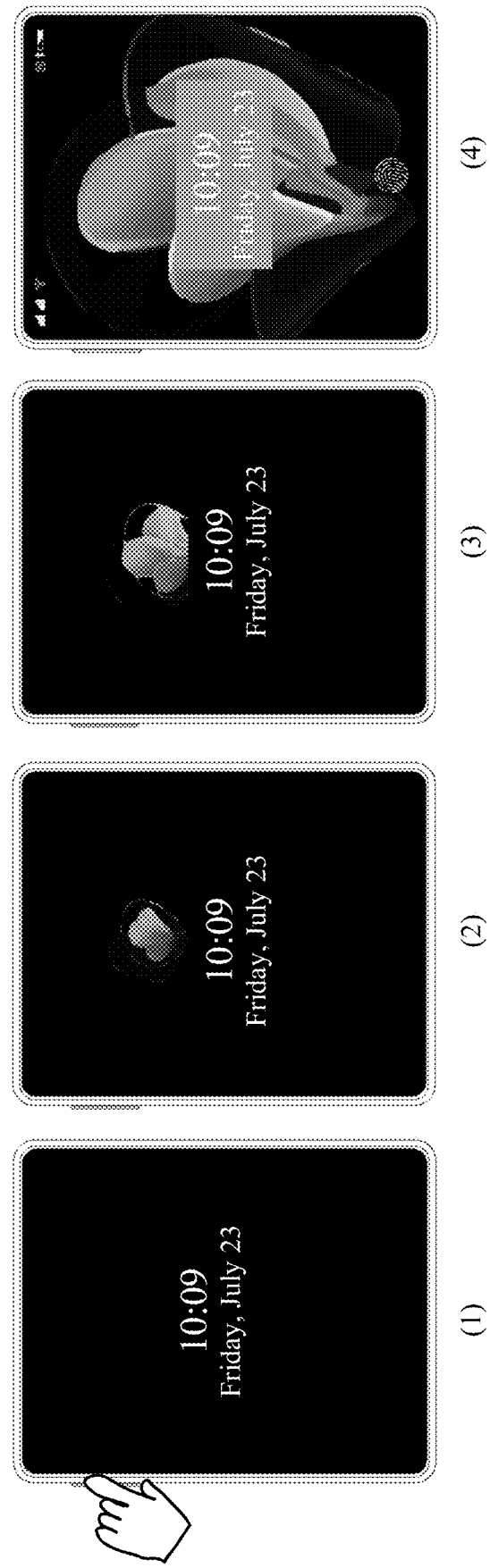
FIG. 6b is a first schematic diagram of a change of a big-screen interface of a foldable phone according to this application.

For example, as shown in FIG. 6b, the foldable phone may display the AOD screen-off interface as shown in (1) of FIG. 6b. In this case, the AOD screen-off interface displays no wallpaper, and is used to display time only.

S6102: Display a dynamic wallpaper corresponding to an AOD screen-off scenario on a big-screen AOD screen-off interface in response to an operation of pressing a power button.

Refer to the foregoing step S5102 in FIG. 5a for a process and principle in step S6102. A difference is that screens for displaying a user interface are different. In step S5102, the dynamic wallpaper corresponding to the AOD screen-off scenario is displayed on the small-screen AOD screen-off interface, while in step S6102, the dynamic wallpaper corresponding to the AOD screen-off scenario is displayed on an AOD screen-off interface of the big screen.

For example, as shown in (1) of FIG. 6b, when the user presses the power button on a left side of the foldable phone, the foldable phone is triggered to perform step S6102, and a big-screen user interface changes from (1) of FIG. 6b to (2) of FIG. 6b, and then from (2) of FIG. 6b to (3) of FIG. 6b. A dynamic wallpaper displayed in (2) of FIG. 6b is the wallpaper image 31 corresponding to the AOD screen-off scenario shown in FIG. 3. A dynamic wallpaper displayed in (3) of FIG. 6b is the wallpaper image 32 corresponding to the AOD screen-off scenario shown in FIG. 3. It can be seen from (2) and (3) of FIG. 6b, that the dynamic wallpaper changes continuously.

S6103: Display a static wallpaper corresponding to a lock screen scenario on a big-screen lock screen interface.

Refer to the foregoing step S5103 in FIG. 5a for a process and principle in step S6103. A difference is that screens for displaying a user interface are different. In step S5103, the static wallpaper corresponding to the lock screen scenario is displayed on the small-screen lock screen interface, while in step S6103, the static wallpaper corresponding to the lock screen scenario is displayed on the big-screen lock screen interface.

For example, as shown in FIG. 6b, after the dynamic wallpaper corresponding to the AOD screen-off scenario is displayed on the big-screen AOD screen-off interface through (1), (2), and (3) of FIG. 6b, the big screen is directly switched from an AOD screen-off interface shown in (3) of FIG. 6b to a lock screen interface shown in (4) of FIG. 6b. The static wallpaper 33 corresponding to the lock screen scenario in FIG. 3 is used on the lock screen interface.

In the application scenario of FIG. 6a, because the dynamic wallpaper corresponding to the AOD screen-off scenario and the static wallpaper corresponding to the lock screen scenario are displayed successively on the big-screen user interface, and it can be known, from the foregoing description of the pre-configured wallpapers corresponding to a plurality of scenarios, that the dynamic wallpaper corresponding to the AOD screen-off scenario and the static wallpaper corresponding to the lock screen scenario are continuously changed, during switching from the small-screen AOD screen-off scenario to the small-screen lock screen scenario in FIG. 6a, wallpaper images are continuously changed. This brings a dynamic effect to the user and provides novel and interesting experience to the user.

Figure 6C:
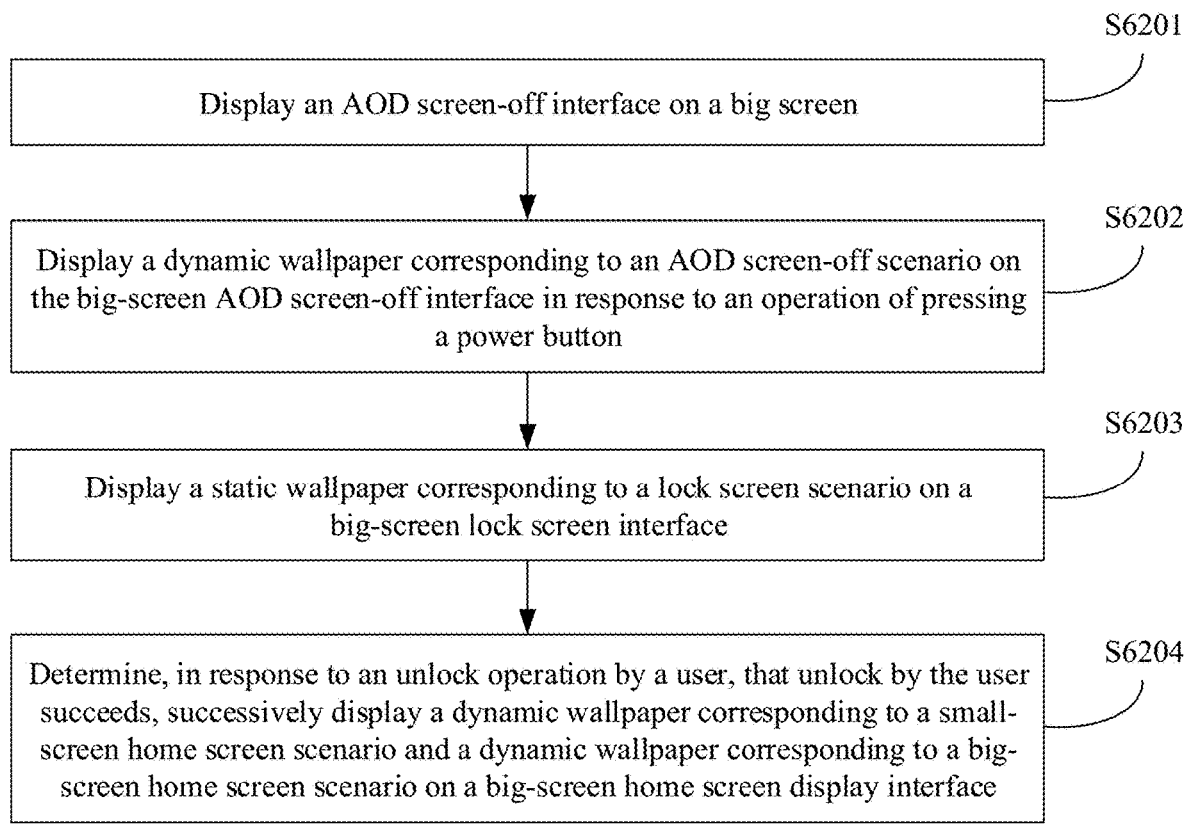
FIG. 6c is a seventh flowchart of a method for displaying a dynamic wallpaper according to this application.

FIG. 6c is a seventh flowchart of a method for displaying a dynamic wallpaper according to an embodiment of this application. The method shown in FIG. 6c is applied to the following scenario: a foldable phone is unfolded into a big screen, switches from a big-screen AOD screen-off scenario to a big-screen lock screen scenario, and switches from the big-screen lock screen scenario to a big-screen home screen scenario.

The method shown in FIG. 6c is applied to the electronic device proposed in an embodiment of this application. In the application scenario, a continuously changing dynamic wallpaper can be displayed based on the pre-configured wallpapers corresponding to a plurality of scenarios proposed in the foregoing embodiments of this application. Taking the foldable phone as an example, steps shown in FIG. 6c are described as follows.

S6201: Display an AOD screen-off interface on a big screen.

Refer to the foregoing step S610 in FIG. 6a for a process and principle of step S6201. The details are not described herein again.

S6202: Display a dynamic wallpaper corresponding to an AOD screen-off scenario on a big-screen AOD screen-off interface in response to an operation of pressing a power button.

Refer to the foregoing step S6102 in FIG. 6a for a process and principle of step S6202. The details are not described herein again.

S6203: Display a static wallpaper corresponding to a lock screen scenario on a big-screen lock screen interface.

Refer to the foregoing step S6103 in FIG. 6a for a process and principle of step S6203. The details are not described herein again.

S6204: Determine, in response to an unlock operation by a user, that unlock by the user succeeds, successively display a dynamic wallpaper corresponding to a small-screen home screen scenario and a dynamic wallpaper corresponding to a big-screen home screen scenario on a big-screen home screen display interface.

Refer to step S4105 in FIG. 4a for a process and principle of step S6204. The details are not described herein again.

Figure 6D:
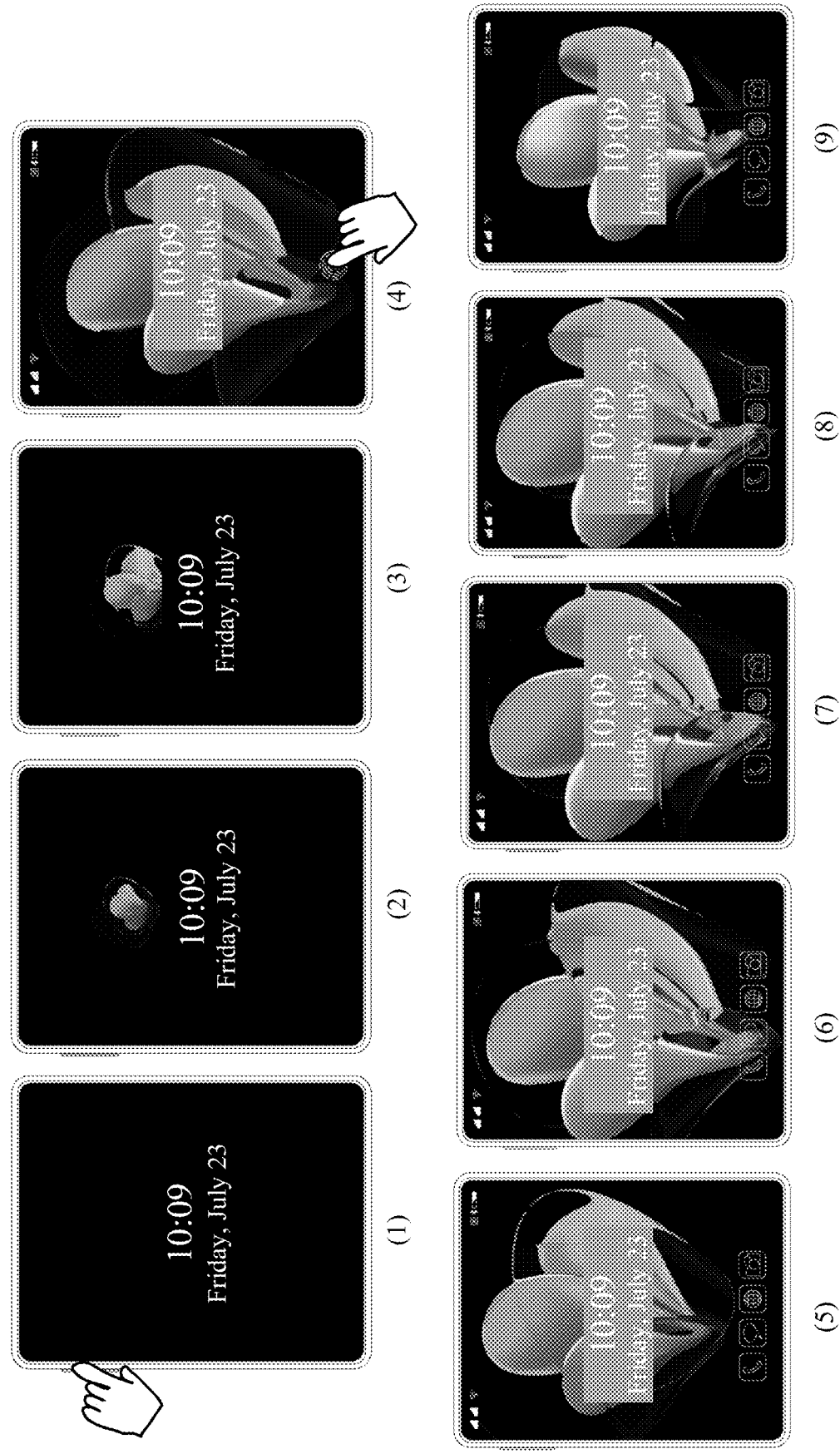
FIG. 6d is a second schematic diagram of a change of a big-screen interface of a foldable phone according to this application.

For example, when the foldable phone performs step S6201 and step S6202, a big-screen AOD screen-off interface changes from (1), (2), to (3) of FIG. 6d, and when the foldable phone performs step S6203, a big-screen display interface changes from (3) of FIG. 6d to a lock screen interface shown in (4) of FIG. 6d. When the foldable phone performs step S6204, (4) of FIG. 6d changes to a home screen interface shown in (5) of FIG. 6d, and then the home screen interface changes in a sequence of (5), (6), (7), (8), and (9) of FIG. 6d. A wallpaper image (2) of FIG. 6d is the wallpaper image 31 corresponding to the AOD screen-off scenario shown in FIG. 3. A wallpaper image (3) of FIG. 6d is the wallpaper image 32 corresponding to the AOD screen-off scenario shown in FIG. 3. A wallpaper image (4) of FIG. 6d is the wallpaper image 33 corresponding to the lock screen scenario shown in FIG. 3. A wallpaper image (5) of FIG. 6d is the wallpaper image 34 corresponding to the small-screen home screen scenario shown in FIG. 3. A wallpaper image (6) of FIG. 6d is the wallpaper image 35 corresponding to the small-screen home screen scenario shown in FIG. 3. A wallpaper image (7) of FIG. 6d is the wallpaper image 36 corresponding to the big-screen home screen scenario shown in FIG. 3. A wallpaper image (8) of FIG. 6d is the wallpaper image 37 corresponding to the big-screen home screen scenario shown in FIG. 3. A wallpaper image (9) of FIG. 6d is the wallpaper image 38 corresponding to the big-screen home screen scenario shown in FIG. 3.

It can be known, from a change process of the wallpaper image shown in FIG. 6d, that in the application scenario of FIG. 6c, because the dynamic wallpaper corresponding to the AOD screen-off scenario, the static wallpaper corresponding to the lock screen scenario, the dynamic wallpaper corresponding to the small-screen home screen scenario, and the dynamic wallpaper corresponding to the big screen scenario are displayed successively on the big-screen user interface, and it can be known, from the foregoing description of the pre-configured wallpapers corresponding to a plurality of scenarios, that the dynamic wallpaper corresponding to the AOD screen-off scenario, the static wallpaper corresponding to the lock screen scenario, the dynamic wallpaper corresponding to the small-screen home screen scenario, and the dynamic wallpaper corresponding to the big screen scenario are continuously changed, during switching from the big-screen AOD screen-off scenario to the big-screen lock screen scenario and from the big-screen lock screen scenario to the big-screen home screen scenario in FIG. 6c, wallpaper images are continuously changed. This brings a dynamic effect to the user and provides novel and interesting experience to the user.

It can be known, from the foregoing description of the method for displaying a dynamic wallpaper proposed in embodiments of this application in a scenario of switch between the big screen and the small screen, in the small screen scenario, and in the big screen scenario, that in the method for displaying a dynamic wallpaper proposed in embodiments of this application, dynamic images can be displayed continuously in the scenario of switch between the big screen and the small screen, in the small screen scenario, and in the big screen scenario because wallpapers corresponding to the scenarios can be displayed continuously in a sequence of scenario generation. This brings a continuously dynamic effect to the user.

Figure 7:
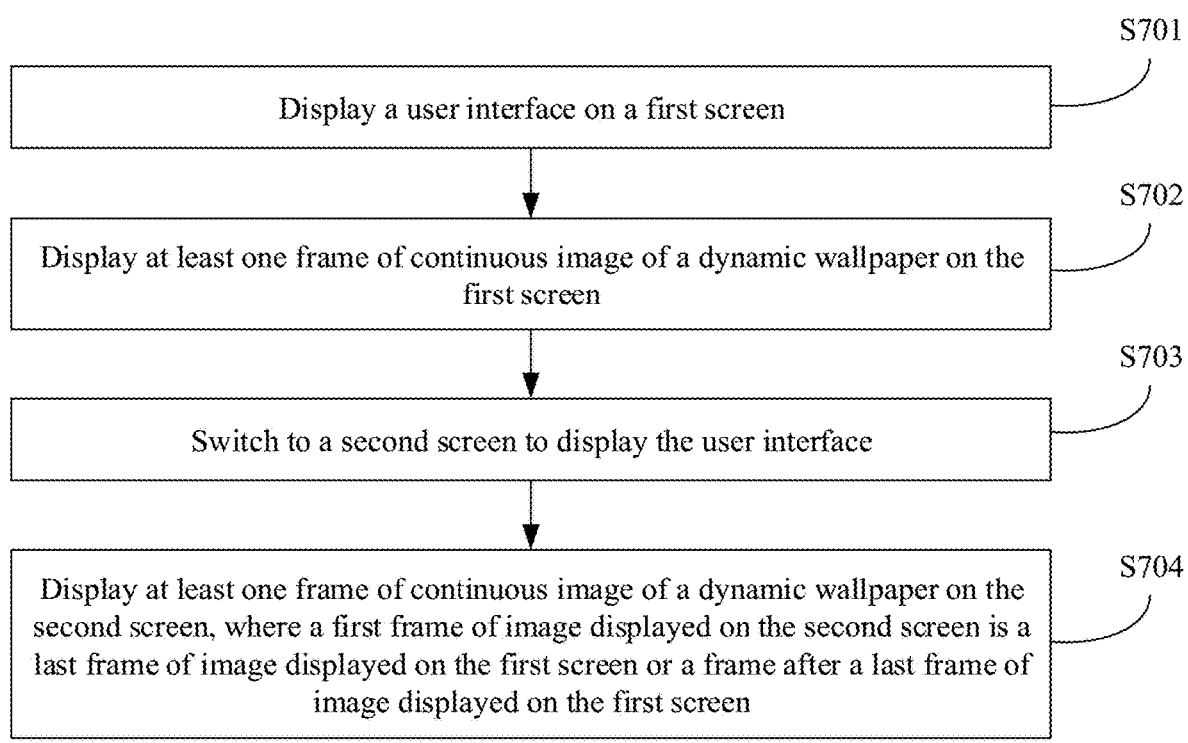
FIG. 7 is an eighth flowchart of a method for displaying a dynamic wallpaper according to an embodiment of this application.
Figure 8C:
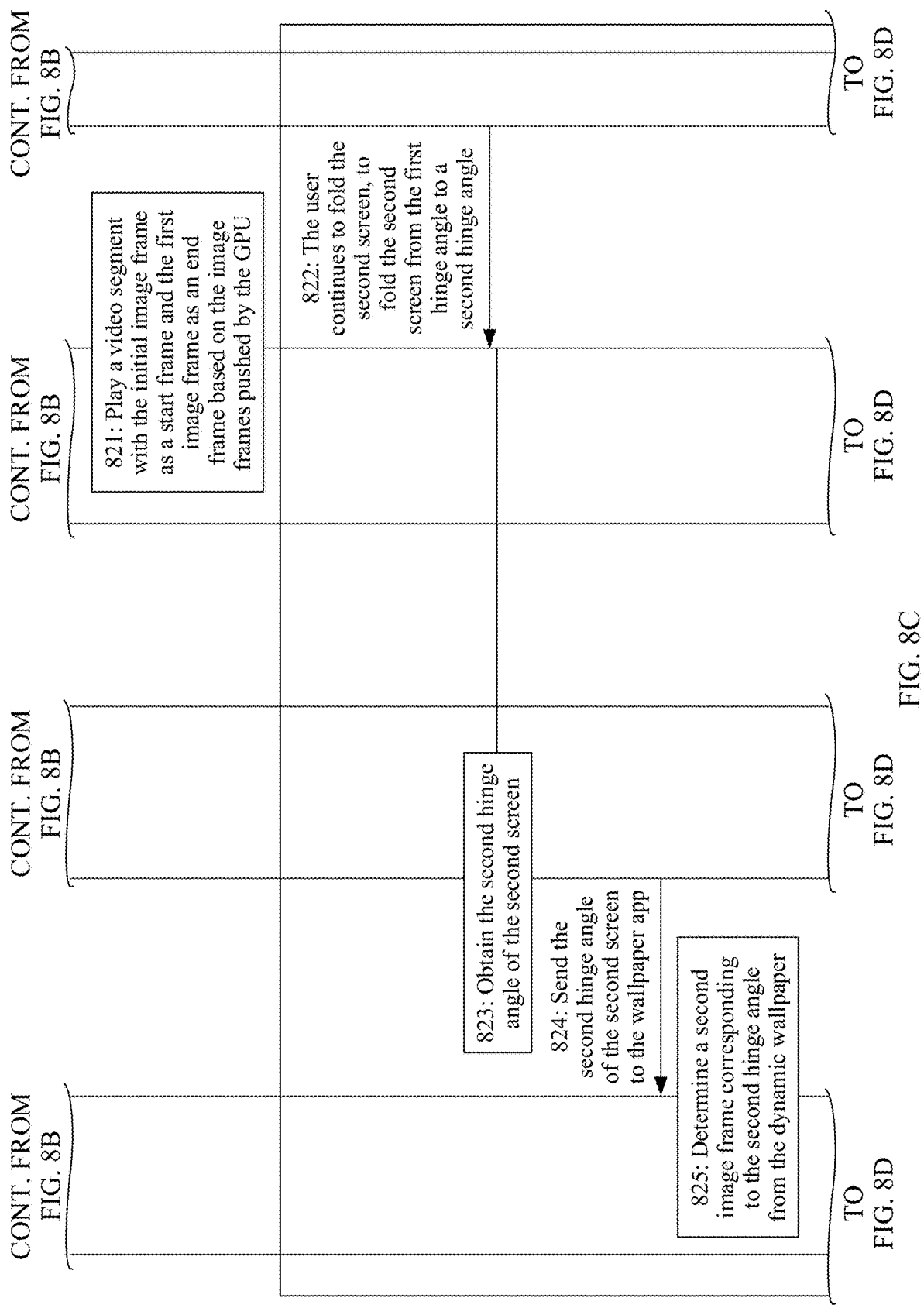
Figure 8D:
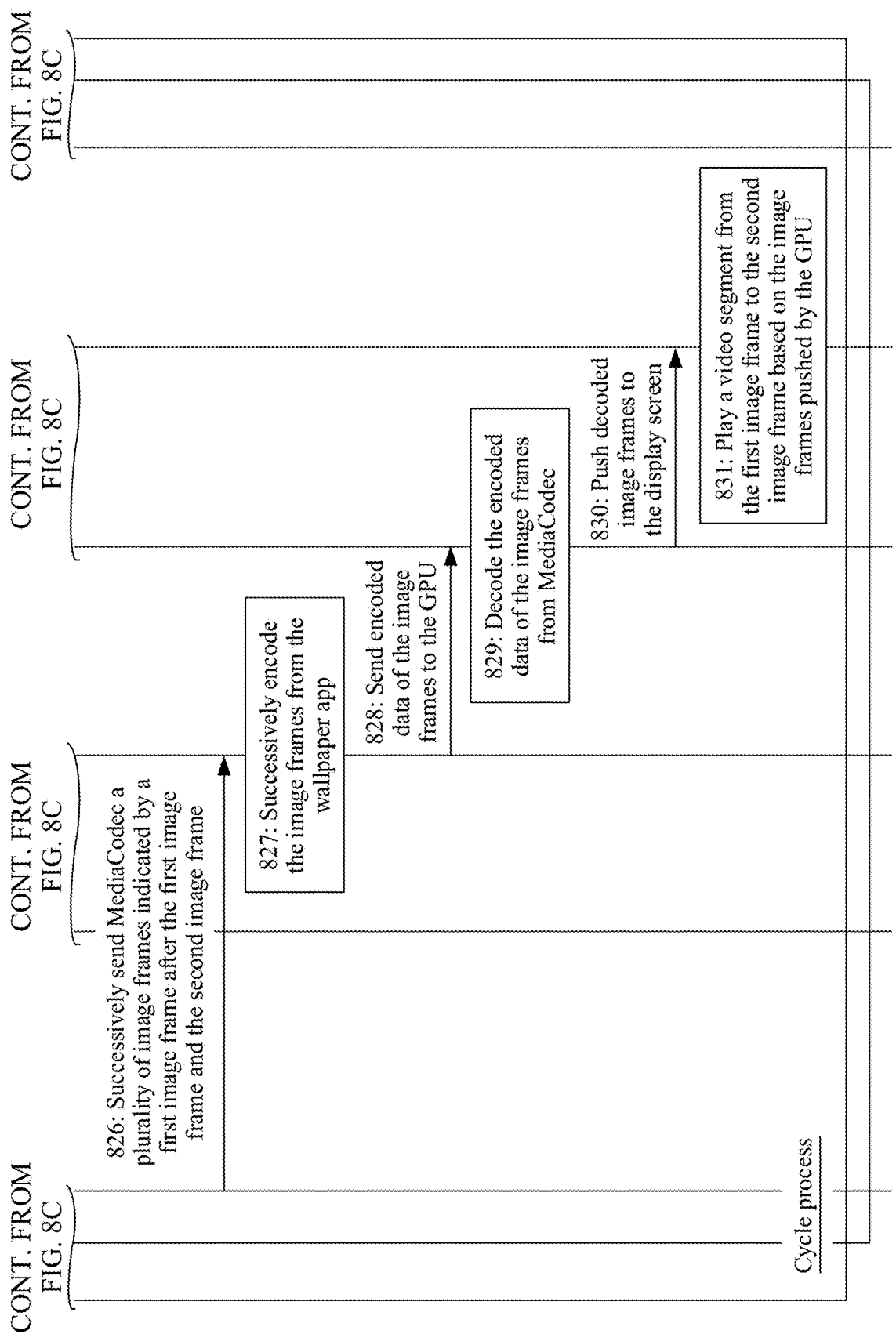

Based on the foregoing related descriptions of FIG. 4a, FIG. 4c, FIG. 4f, FIG. 5a, FIG. 5b, FIG. 6a, and FIG. 6c, refer to FIG. 7, an embodiment of this application proposes a method for displaying a dynamic wallpaper, and the method is applied to the electronic device proposed in an embodiment of this application. The electronic device includes a display screen with an adjustable display size of a user interface. The display screen with an adjustable display size is configured to display a user interface on a first screen or display a user interface on a second screen. A display size of the first screen is different from a display size of the second screen. For example, the first screen may be the small screen mentioned in embodiments of this application, and the second screen may be the big screen mentioned in embodiments of this application. For example, the first screen may be the big screen mentioned in embodiments of this application, and the second screen may be the small screen mentioned in embodiments of this application. The method specifically includes the following steps.

S701: Display the user interface on the first screen.

The user interface may be a home screen interface, a lock screen interface, an AOD screen-off interface, or the like. For example, if a condition in which the user interface is displayed on the first screen is satisfied, the user interface may be displayed on the first screen. When the display screen with an adjustable display size is a foldable screen, the condition in which a user interface is displayed on the first screen may be that a hinge angle is less than or equal to a first preset angle.

S702: Display at least one frame of continuous image of a dynamic wallpaper on the first screen.

For a performing process and principle of step S702, refer to the foregoing related content in step S4101 to step S4103 of FIG. 4a, step S4201 to step S4204 of FIG. 4c, step S4301 of FIG. 4f, step S5101 to step S5103 of FIG. 5a, step S5201 to S5204 of FIG. 5b, and step S610 to step S6103 of FIG. 6a. The details are not described herein again.

The at least one frame of continuous image of the dynamic wallpaper mentioned in step S702 can be understood as a dynamic wallpaper with continuous images corresponding to at least one scenario or a static wallpaper corresponding to at least one scenario mentioned in this embodiment of this application.

In some embodiments, a process of performing step S702 can be understood as displaying at least one frame of continuous image corresponding to a first home screen scenario on the first screen in response to an operation of switching to a home screen scenario. The at least one frame of continuous image corresponding to the first home screen scenario is a wallpaper corresponding to a small-screen home screen scenario in embodiments of this application. Refer to related content of step S4203 and step S4204 of FIG. 4c and step S5204 of FIG. 5b. The details are not described herein again.

In some embodiments, before the displaying at least one frame of continuous image corresponding to the first home screen scenario on the first screen in response to an operation of switching to a home screen scenario, the method may further include: successively displaying at least one frame of continuous image corresponding to an AOD screen-off scenario and at least one frame of continuous image corresponding to the lock screen scenario on the first screen in response to an operation of switching to a lock screen scenario. Refer to related content of step S4101 to step S4103 of FIG. 4a, step S4201 to S4203 of FIG. 4c, step S5101 to step S5103 of FIG. 5a, and step S5201 to step S5203 of FIG. 5b. The details are not described herein again.

The at least one frame of continuous image corresponding to the AOD screen-off scenario is the wallpaper corresponding to the AOD screen-off scenario in the foregoing embodiment of this application. The at least one frame of continuous image corresponding to the lock screen scenario is the wallpaper corresponding to the lock screen scenario in the foregoing embodiment of this application. For the at least one frame of continuous image corresponding to the AOD screen-off scenario and at least one frame of continuous image corresponding to the lock screen scenario, a first frame of image corresponding to the lock screen scenario is a frame of image after a last frame of image corresponding to the AOD screen-off scenario.

S703: Switch to the second screen for displaying the user interface.

For example, if a condition in which the user interface is displayed on the second screen is satisfied, the first screen is switched to the second screen for displaying the user interface. The condition in which the user interface is displayed on the second screen may be that the hinge angle is greater than or equal to a second preset angle. Specifically, for a process and principle of performing step S703, refer to related content of step S4104 of FIG. 4a, step S4205 of FIG. 4c, and step S4302 of FIG. 4f. The details are not described herein again.

S704: Display at least one frame of continuous image of the dynamic wallpaper on the second screen, where a first frame of image displayed on the second screen is a last frame of image displayed on the first screen or a frame after a last frame of image displayed on the first screen.

In some embodiments, in step S702, if the at least one frame of continuous image corresponding to the first home screen scenario is displayed on the first screen in response to the operation of switching to the home screen scenario, step S704 is implemented in the following manner. If all of the at least one frame of continuous image corresponding to the first home screen scenario are displayed on the first screen, at least one frame of continuous image corresponding to the second home screen scenario is displayed on the second screen. If all of the at least one frame of continuous image corresponding to the first home screen scenario are not displayed on the first screen, an image that is corresponding to the first home screen scenario and that is not displayed on the first screen and the at least one frame of continuous image corresponding to the second home screen scenario are displayed successively on the second screen. Refer to related content from step S4205 to step S4207 of FIG. 4c. The details are not described herein again. The at least one frame of continuous image corresponding to the second home screen scenario is the wallpaper corresponding to the big-screen home screen scenario proposed in the foregoing embodiment of this application. A first frame of image corresponding to the second home screen scenario is a frame after a last frame of image corresponding to the first home screen scenario.

In some embodiments, if the operation of switching to the lock screen scenario is performed in step S702, the at least one frame of continuous image corresponding to the AOD screen-off scenario and at least one frame of continuous image corresponding to the lock screen scenario are displayed successively on the first screen. Then in step S704, the last frame of image corresponding to the lock screen scenario may be displayed on the second screen. Specifically, refer to step S4103 and step S4104 of FIG. 4a. In some other embodiments, after the last frame of image corresponding to the lock screen scenario is displayed on the second screen, the method further includes: successively displaying the at least one frame of continuous image corresponding to the first home screen scenario and the at least one frame of continuous image corresponding to the second home screen scenario on the second screen in response to the operation of switching to the home screen scenario. Specifically, refer to step S4105 in FIG. 4a.

In some embodiments, if it is detected that the hinge angle is reduced, the at least one frame of continuous image corresponding to the second home screen scenario is displayed on the second screen in a reverse sequence of an image arrangement sequence based on the hinge angle, until the first screen is switched to for displaying the user interface. Then the last frame of image corresponding to the first home screen scenario is displayed on the first screen. Specifically, refer to step S4301 and step S4302 of FIG. 4f.

In some embodiments, the display screen with an adjustable display size is the foldable screen, and the second screen includes two display screens. The first screen includes one display screen. A display progress of the at least one frame of image of the dynamic wallpaper on the second screen is positively related to a value of the hinge angle. The hinge angle is an included angle between planes in which two display screens included in the second screen are respectively located.

For example, refer to FIG. 8A to FIG. 8D. In some embodiments, if a display progress (or a play process) of at least one frame of image of a dynamic wallpaper on a second screen is positively related to a value of a hinge angle, in embodiments of this application, a manner in which the at least one frame of image of the dynamic wallpaper is displayed on the second screen may be a wallpaper folding process shown in FIG. 8A to FIG. 8D. The process specifically includes the following steps.

Step 810: When the second screen is in an unfolded state or a completely folded state, a user folds the second screen.

Step 811: A sensor obtains a first hinge angle of the second screen.

Step 812: The sensor sends the first hinge angle of the second screen to a wallpaper app.

For example, the wallpaper app may register with the sensor, and after registering with the sensor, the wallpaper app can listen to a hinge angle obtained by the sensor.

Step 813: If the wallpaper app determines, based on the first hinge angle of the second screen, that the second screen is in a folded state, the wallpaper app determines whether the second screen is playing the dynamic wallpaper.

The determining whether the second screen is playing the dynamic wallpaper or not is determining whether the second screen is playing the at least one frame of image of the dynamic wallpaper or not.

Step 814: If the wallpaper app determines that the second screen is playing the dynamic wallpaper, the wallpaper app controls the second screen to stop playing the dynamic wallpaper, and determines an initial image frame corresponding to an initial hinge angle in the folded state and a first image frame corresponding to a current first hinge angle based on an image frame sequence.

Step 815: If the wallpaper app determines that the second screen is not playing the dynamic wallpaper, the wallpaper app determines an initial image frame corresponding to an initial hinge angle in the folded state and a first image frame corresponding to a current first hinge angle based on at least one frame of continuous image included in the dynamic wallpaper.

Step 816: The wallpaper app successively sends a plurality of image frames corresponding to the initial image frame and the first image frame to MediaCodec.

The plurality of image frames corresponding to the initial image frame and the first image frame includes the initial image frame, an image frame between the initial image frame and the first image frame, and the first image frame.

Step 817: MediaCodec successively encodes the image frames from the wallpaper app.

Step 818: MediaCodec sends encoded data of the image frames to a GPU.

Step 819: The GPU decodes the encoded data of the image frames from MediaCodec.

Step 820: The GPU successively pushes decoded image frames to the second screen.

Step 821: The second screen plays a video segment with the initial image frame as a start frame and the first image frame as an end frame based on the image frames pushed by the GPU.

Step 822: The user continues to fold the second screen, to fold the second screen from the first hinge angle to a second hinge angle.

Step 823: The sensor obtains the second hinge angle of the second screen.

Step 824: The sensor sends the second hinge angle of the second screen to the wallpaper app.

Step 825: The wallpaper app determines a second image frame corresponding to the second hinge angle based on at least one frame of continuous image included in the dynamic wallpaper.

Step 826: The wallpaper app successively sends MediaCodec a plurality of image frames indicated by a first image frame after the first image frame and the second image frame.

The plurality of image frames indicated by a first image frame after the first image frame and the second image frame include an image frame between the first image frame and the second image frame, and the second image.

Step 827: MediaCodec successively encodes the image frames from the wallpaper app.

Step 828: MediaCodec sends encoded data of the image frames to a GPU.

Step 829: The GPU decodes the encoded data of the image frames from MediaCodec.

Step 830: The GPU successively pushes decoded image frames to the second screen.

Step 831: The second screen plays a video segment from the first image frame to the second image frame based on the image frames pushed by the GPU.

In addition, while the user continues to fold the second screen, the foregoing step 822 to step 831 may also be performed circularly, to dynamically play the dynamic wallpaper on the second screen with a change of the hinge angle of the second screen.

For example, the dynamic wallpaper includes a total of 371 frames of continuous images. A first frame to a $70^{th}$ frame are a dynamic wallpaper corresponding to an AOD screen-off scenario. A $71^{st}$ frame is a static wallpaper corresponding to a lock screen scenario. A $72^{nd}$ frame to a $131^{st}$ frame are a dynamic wallpaper corresponding to a first home screen scenario. A $132^{nd}$ frame to a $300^{th}$ frame are a dynamic wallpaper corresponding to a second home screen scenario. The process shown in FIG. 7 may be performed as follows: The user interface is displayed on the first screen, images from the $72^{nd}$ frame to the $131^{st}$ frame are displayed successively based on an image arrangement sequence on the first screen, the second screen is switched to for displaying the user interface, and images from the $132^{nd}$ frame to the $300^{th}$ frame are displayed on the second screen based on the image arrangement sequence. During switching from the first screen to the second screen, an image on the second screen is still continuous with an image on the first screen. This brings a continuously dynamic effect to the user.

In the method for displaying a dynamic wallpaper proposed in embodiments of this application, when the user interface is displayed on the first screen, the at least one frame of continuous image of the dynamic wallpaper is displayed, presenting the continuous dynamic effect. When the second screen is switched to for displaying the user interface, the at least one frame of continuous image of the dynamic wallpaper is displayed on the second screen. Because the first frame of image displayed on the second screen is the last frame of image displayed on the first screen or the frame after the last frame of image displayed on the first screen, not only the dynamic wallpaper displayed on the second screen presents the continuously dynamic effect, but also the image displayed on the second screen and the image displayed on the first screen are continuous. This can further bring use experience of smoothly switching between display screens to the user during switching from the first screen to the second screen.

This embodiment further provides a computer-readable storage medium. The computer-readable storage medium includes instructions. When the instructions are run on an electronic device, the electronic device is enabled to perform any method for display a dynamic wallpaper proposed in the embodiments of this application.

This embodiment further provides a computer program product including instructions. When the computer program product is run on an electronic device, the electronic device is enabled to perform any method for displaying a dynamic wallpaper proposed in the embodiments of this application.

This embodiment further provides a control device. The control device includes a processor and a memory. The memory is configured to store computer program code. The computer program code includes computer instructions. When the processor executes the computer instructions, the control device performs any method for displaying a dynamic wallpaper proposed in embodiments of this application. The control device can be an integrated circuit IC or a system-on-chip SOC. The integrated circuit may be a general integrated circuit, a field programmable gate array FPGA, or an application-specific integrated circuit ASIC.

The foregoing descriptions about implementations allow a person skilled in the art to understand that, for the purpose of convenient and brief description, division of the foregoing functional modules is taken as an example for illustration. In actual application, the foregoing functions can be allocated to different modules and implemented according to a requirement, that is, an inner structure of an apparatus is divided into different functional modules to implement all or some of the functions described above. For a detailed working process of the foregoing system, apparatus, and unit, reference may be made to a corresponding process in the foregoing method embodiments. The details are not described herein again.

For the several embodiments provided in this embodiment, it should be understood that the disclosed system, apparatus, and method may be implemented in other manners. For example, the described apparatus embodiment is merely an example. For example, division of the module or unit is merely logical function division or may be other division in actual implementation. For example, a plurality of units or components may be combined or integrated into another system, or some features may be ignored or not performed. In addition, the displayed or discussed mutual couplings or direct couplings or communication connections may be implemented through some interfaces. Indirect couplings or communication connections between the apparatuses or units may be implemented in electronic, mechanical, or other forms.

The units described as separate components may or may not be physically separate, and parts displayed as units may or may not be physical units, may be located in one place, or may be distributed on multiple network units. Some or all of the units may be selected based on an actual requirement to implement the objectives of the solutions in the embodiments.

In addition, the functional units in each of the embodiments may be integrated into one processing unit, or each of the units may exist alone physically, or two or more units may be integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such understanding, the technical solutions of this embodiment essentially, or the part contributing to the conventional technology, or all or some of the technical solutions of the technical solutions may be implemented in a form of a software product. The computer software product is stored in a storage medium and includes several instructions for instructing a computer device (which may be a personal computer, a server, a network device, or the like) to perform all or some of the steps of the methods described in the embodiments. The foregoing storage medium includes various media that can store program code such as a flash memory, a removable hard disk, a read-only memory, a random-access memory, a magnetic disk, or an optical disc.

The foregoing descriptions are merely specific implementations of this application, but are not intended to limit the protection scope of this application. Any variation or replacement within the technical scope disclosed in this application shall fall within the protection scope of this application. Therefore, the protection scope of this application shall be subject to the protection scope of the claims.

What is claimed is:

1. A method for displaying a dynamic wallpaper, wherein the method is applied to an electronic device, and the electronic device comprises one or more display screens with an adjustable display size, the one or more display screens with the adjustable display size are configured to display a user interface on a first screen or display the user interface on a second screen, a display size of the first screen is different from a display size of the second screen, the one or more display screens with the adjustable display size comprise a foldable screen, the second screen comprises two display screens, the first screen comprises one display screen, and the method for displaying the dynamic wallpaper comprises:

displaying the user interface on the first screen;

displaying at least one frame of continuous image of a dynamic wallpaper on the first screen;

switching to the second screen for displaying the user interface; and displaying another at least one frame of continuous image of the dynamic wallpaper on the second screen, wherein a first frame of image displayed on the second screen is a last frame of image displayed on the first screen or a frame after a last frame of image displayed on the first screen, and a display progress of the another at least one frame of continuous image of the dynamic wallpaper on the second screen is positively related to a value of a hinge angle, and the hinge angle is an included angle between the two display screens comprised in the second screen;

wherein the dynamic wallpaper comprises: at least one frame of continuous image corresponding to a first home screen scenario and at least one frame of continuous image corresponding to a second home screen scenario, and a first frame of the at least one frame of continuous image corresponding to the second home screen scenario is a frame after a last frame of the at least one frame of continuous image corresponding to the first home screen scenario; and wherein the displaying at least one frame of continuous image of the dynamic wallpaper on the first screen comprises:

displaying the at least one frame of continuous image corresponding to the first home screen scenario on the first screen in response to an operation of switching to a home screen scenario; and wherein the displaying another at least one frame of continuous image of the dynamic wallpaper on the second screen comprises:

when all frames of the at least one frame of continuous image corresponding to the first home screen scenario are displayed on the first screen, displaying the at least one frame of continuous image corresponding to the second home screen scenario on the second screen; or when all frames of the at least one frame of continuous image corresponding to the first home screen scenario are not displayed on the first screen, successively displaying, on the second screen, an image that is corresponding to the first home screen scenario and that is not displayed on the first screen, and the at least one frame of continuous image corresponding to the second home screen scenario.

2. The method according to claim 1, wherein the dynamic wallpaper further comprises: at least one frame of continuous image corresponding to an always on display (AOD) screen-off scenario and at least one frame of continuous image corresponding to a lock screen scenario; and a first frame of the at least one frame of continuous image corresponding to the lock screen scenario is a frame after a last frame of the at least one frame of continuous image corresponding to the AOD screen-off scenario; and wherein before the displaying the at least one frame of continuous image corresponding to the first home screen scenario on the first screen in response to an operation of switching to a home screen scenario, the method further comprises:

successively displaying the at least one frame of continuous image corresponding to the AOD screen-off scenario and the at least one frame of continuous image corresponding to the lock screen scenario on the first screen in response to an operation of switching to the lock screen scenario.

3. The method according to claim 1, wherein after the displaying the another at least one frame of continuous image of the dynamic wallpaper on the second screen, the method further comprises:
when it is detected that the hinge angle is reduced, displaying the at least one frame of continuous image corresponding to the second home screen scenario on the second screen based on the hinge angle in a reverse sequence of an image arrangement sequence, until the first screen is switched to for displaying the user interface, and then displaying the last frame of image corresponding to the first home screen scenario on the first screen.

4. The method according to claim 1, wherein the dynamic wallpaper further comprises: at least one frame of continuous image corresponding to an always on display (AOD) screen-off scenario and at least one frame of continuous image corresponding to a lock screen scenario; and the first frame of the at least one frame of continuous image corresponding to the lock screen scenario is a frame after a last frame of the at least one frame of continuous image corresponding to the AOD screen-off scenario;
wherein after the displaying at least one frame of continuous image of the dynamic wallpaper on the second screen, the method further comprises:
displaying an AOD screen-off interface that does not comprise an image of the dynamic wallpaper on the second screen; and
successively displaying the at least one frame of continuous image corresponding to the AOD screen-off scenario and the at least one frame of continuous image corresponding to the lock screen scenario on the second screen in response to an operation of switching to the lock screen scenario;
wherein a first frame of the at least one frame of continuous image corresponding to the first home screen scenario is a frame after a last frame of the at least one frame of continuous image corresponding to the lock screen scenario; and
wherein after successively displaying the at least one frame of continuous image corresponding to the AOD screen-off scenario and the at least one frame of continuous image corresponding to the lock screen scenario on the second screen in response to the operation of switching to the lock screen scenario, the method further comprises:
successively displaying the at least one frame of continuous image corresponding to the first home screen scenario and the at least one frame of continuous image corresponding to the second home screen scenario on the second screen in response to an operation of switching to a home screen scenario.

5. The method according to claim 1, wherein displaying the at least one frame of continuous image corresponding to the first home screen scenario on the first screen in response to the operation of switching to the home screen scenario comprises:
determining, in response to an unlock operation, that unlock succeeds; and
displaying the at least one frame of continuous image corresponding to the first home screen scenario on a home screen interface of the first screen;
wherein the displaying the at least one frame of continuous image corresponding to the second home screen scenario on the second screen comprises:
displaying the at least one frame of continuous image corresponding to the second home screen scenario on a home screen interface of the second screen; and
wherein the successively displaying, on the second screen, an image that is corresponding to the first home screen scenario and that is not displayed on the first screen, and the at least one frame of continuous image corresponding to the second home screen scenario on the second screen comprises:
successively displaying the image that is corresponding to the first home screen scenario and that is not displayed on the first screen, and the at least one frame of continuous image corresponding to the second home screen scenario on the home screen interface of the second screen.

6. The method according to claim 2, wherein the successively displaying the at least one frame of continuous image corresponding to the AOD screen-off scenario and the at least one frame of continuous image corresponding to the lock screen scenario on the first screen in response to an operation of switching to the lock screen scenario comprises:
determining, in response to an operation of turning on a screen or in response to an unlock operation, that unlock fails;
displaying the at least one frame of continuous image corresponding to the AOD screen- off scenario on an AOD screen-off interface of the first screen; and
displaying the at least one frame of continuous image corresponding to the lock screen scenario on a lock screen interface of the first screen.

7. The method according to claim 3, wherein after the displaying the at least one frame of continuous image corresponding to the second home screen scenario on the second screen in a reverse sequence of an image arrangement sequence, the method further comprises:
displaying the at least one frame of continuous image corresponding to the second home screen scenario on a home screen interface of the second screen in the reverse sequence of an image arrangement sequence; and
wherein the displaying the last frame of image corresponding to the first home screen scenario on the first screen comprises:
displaying the last frame of image corresponding to the first home screen scenario on a home screen interface of the first screen.

8. An electronic device, comprising:
one or more processors;
a memory; and
one or more display screens with an adjustable display size, configured to display a user interface on a first screen or display the user interface on a second screen, wherein a display size of the first screen is different from a display size of the second screen, the one or more display screens with the adjustable display size is one or more foldable screens, the second screen comprises two display screens, and the first screen comprises one display screen; and
wherein the display screen is coupled with the one or more processors, the memory stores program code, and the one or more processors are configured to run the program code, to enable the electronic device to implement the following:
  displaying the user interface on the first screen;
  displaying at least one frame of continuous image of a dynamic wallpaper on the first screen;
  switching to the second screen for displaying the user interface; and
  displaying another at least one frame of continuous image of the dynamic wallpaper on the second screen, wherein a first frame of the another at least one frame of continuous image displayed on the second screen is a last frame of image displayed on the first screen or a frame after a last frame of image displayed on the first screen, and a display progress of the another at least one frame of continuous image of the dynamic wallpaper on the second screen is positively related to a value of a hinge angle, and the hinge angle is an included angle between the two display screens comprised in the second screen;
  wherein the dynamic wallpaper comprises at least one frame of continuous image corresponding to a first home screen scenario and at least one frame of continuous image corresponding to a second home screen scenario, wherein a first frame of the at least one frame of continuous image corresponding to the second home screen scenario is a frame after a last frame of the at least one frame of continuous image corresponding to the first home screen scenario;
  wherein displaying the at least one frame of continuous image of the dynamic wallpaper on the first screen comprises:
    displaying the at least one frame of continuous image corresponding to the first home screen scenario on the first screen in response to an operation of switching to a home screen scenario; and
  wherein displaying the another at least one frame of continuous image of the dynamic wallpaper on the second screen comprises:
    when all frames of the at least one frame of continuous image corresponding to the first home screen scenario are displayed on the first screen, displaying the at least one frame of continuous image corresponding to the second home screen scenario on the second screen; or
    when all frames of the at least one frame of continuous image corresponding to the first home screen scenario are not displayed on the first screen, successively displaying, on the second screen, an image that is corresponding to the first home screen scenario and that is not displayed on the first screen, and the at least one frame of continuous image corresponding to the second home screen scenario.

9. The electronic device according to claim 8, wherein the dynamic wallpaper further comprises: at least one frame of continuous image corresponding to an always on display (AOD) screen-off scenario and at least one frame of continuous image corresponding to a lock screen scenario, wherein a first frame of the at least one frame of continuous image corresponding to the lock screen scenario is a frame after a last frame of the at least one frame of continuous image corresponding to the AOD screen-off scenario; and
  wherein when the one or more processors run the program code, the electronic device is enabled to further implement the following:
    before displaying the at least one frame of continuous image corresponding to the first home screen scenario on the first screen in response to an operation of switching to the home screen scenario, successively displaying the at least one frame of continuous image corresponding to the AOD screen-off scenario and the at least one frame of continuous image corresponding to the lock screen scenario on the first screen in response to an operation of switching to the lock screen scenario.

10. The electronic device according to claim 8, wherein when the one or more processors run the program code, the electronic device is enabled to further implement the following:
  after displaying the at least one frame of continuous image of the dynamic wallpaper on the second screen, when it is detected that the hinge angle is reduced, displaying the at least one frame of continuous image corresponding to the second home screen scenario on the second screen based on the hinge angle in a reverse sequence of an image arrangement sequence, until the first screen is switched to for displaying the user interface, and then displaying the last frame of the at least one frame of continuous image corresponding to the first home screen scenario on the first screen.

11. The electronic device according to claim 8, wherein the dynamic wallpaper further comprises: the at least one frame of continuous image corresponding to an always on display (AOD) screen-off scenario and at least one frame of continuous image corresponding to a lock screen scenario, and a first frame of the at least one frame of continuous image corresponding to the lock screen scenario is the frame after a last frame of the at least one frame of continuous image corresponding to the AOD screen-off scenario; and
  wherein when the one or more processors run the program code, the electronic device is enabled to further implement the following:
    after displaying the another at least one frame of continuous image of the dynamic wallpaper on the second screen, displaying a always on display (AOD) screen-off interface that does not comprise an image of the dynamic wallpaper on the second screen; and
    successively displaying the at least one frame of continuous image corresponding to the AOD screen-off scenario and the at least one frame of continuous image corresponding to the lock screen scenario on the second screen in response to an operation of switching to the lock screen scenario;
  wherein a first frame of the at least one frame of continuous image corresponding to the first home screen scenario is a frame after a last frame of the at least one frame of continuous image corresponding to the lock screen scenario; and
  after successively displaying the at least one frame of continuous image corresponding to the AOD screen-off scenario and the at least one frame of continuous image corresponding to the lock screen scenario on the second screen in response to an operation of switching to the lock screen scenario, successively displaying the at least one frame of continuous image corresponding to the first home screen scenario and the at least one frame of continuous image corresponding to the second home screen scenario on the second screen in response to an operation of switching to a home screen scenario.

12. The electronic device according to claim 8, wherein displaying the at least one frame of continuous image corresponding to the first home screen scenario on the first screen in response to an operation of switching to the home screen scenario comprises:
- determining, in response to an unlock operation, that unlock succeeds; and
- displaying the at least one frame of continuous image corresponding to the first home screen scenario on a home screen interface of the first screen;
- wherein displaying the at least one frame of continuous image corresponding to the second home screen scenario on the second screen comprises:
  - displaying the at least one frame of continuous image corresponding to the second home screen scenario on a home screen interface of the second screen; and
- wherein successively displaying an image that is corresponding to the first home screen scenario and that is not displayed on the first screen, and the at least one frame of continuous image corresponding to the second home screen scenario on the second screen comprises:
  - successively displaying the image that is corresponding to the first home screen scenario and that is not displayed on the first screen, and the at least one frame of continuous image corresponding to the second home screen scenario on the home screen interface of the second screen.

13. The electronic device according to claim 9, wherein successively displaying the at least one frame of continuous image corresponding to the AOD screen-off scenario and the at least one frame of continuous image corresponding to the lock screen scenario on the first screen in response to the operation of switching to the lock screen scenario comprises:
- determining, in response to an operation of turning on a screen or in response to an unlock operation, that unlock fails;
- displaying the at least one frame of continuous image corresponding to the AOD screen- off scenario on an AOD screen-off interface of the first screen; and
- displaying the at least one frame of continuous image corresponding to the lock screen scenario on a lock screen interface of the first screen.

14. The electronic device according to claim 10, wherein after displaying the at least one frame of continuous image corresponding to the second home screen scenario on the second screen based on the hinge angle in the reverse sequence of the image arrangement sequence comprises:
- displaying the at least one frame of continuous image corresponding to the second home screen scenario on a home screen interface of the second screen in the reverse sequence of the image arrangement sequence; and
- wherein displaying the last frame of the at least one frame of continuous image corresponding to the first home screen scenario on the first screen comprises:
  - displaying the last frame of the at least one frame of continuous image corresponding to the first home screen scenario on a home screen interface of the first screen.

15. The electronic device according to claim 11, wherein the successively displaying the at least one frame of continuous image corresponding to the first home screen scenario and the at least one frame of continuous image corresponding to the second home screen scenario on the second screen in response to an operation of switching to a home screen scenario comprises:
- determining, in response to an unlock operation, that unlock succeeds; and
- successively displaying the at least one frame of continuous image corresponding to the first home screen scenario and the at least one frame of continuous image corresponding to the second home screen scenario on a home screen interface of the second screen.

16. A non-transitory computer-readable storage medium storing instructions, wherein when the instructions are run on an electronic device, the electronic device is enabled to perform the following actions:
- displaying a user interface on a first screen;
- displaying at least one frame of continuous image of a dynamic wallpaper on the first screen;
- switching to a second screen for displaying the user interface; and
- displaying another at least one frame of continuous image of the dynamic wallpaper on the second screen, wherein a first frame of image displayed on the second screen is a last frame of image displayed on the first screen or a frame after a last frame of image displayed on the first screen, and a display progress of the another at least one frame of continuous image of the dynamic wallpaper on the second screen is positively related to a value of a hinge angle, and the hinge angle is an included angle between two display screens comprised in the second screen;
- wherein the dynamic wallpaper comprises: at least one frame of continuous image corresponding to a first home screen scenario and at least one frame of continuous image corresponding to a second home screen scenario, and a first frame of the at least one frame of continuous image corresponding to the second home screen scenario is a frame after a last frame of the at least one frame of continuous image corresponding to the first home screen scenario; and
- wherein the displaying at least one frame of continuous image of the dynamic wallpaper on the first screen comprises:
  - displaying the at least one frame of continuous image corresponding to the first home screen scenario on the first screen in response to an operation of switching to a home screen scenario; and
- wherein the displaying another at least one frame of continuous image of the dynamic wallpaper on the second screen comprises:
  - when all frames of the at least one frame of continuous image corresponding to the first home screen scenario are displayed on the first screen, displaying the at least one frame of continuous image corresponding to the second home screen scenario on the second screen; or
  - when all frames of the at least one frame of continuous image corresponding to the first home screen scenario are not displayed on the first screen, successively displaying, on the second screen, an image that is corresponding to the first home screen scenario and that is not displayed on the first screen, and the at least one frame of continuous image corresponding to the second home screen scenario.

17. The non-transitory computer-readable storage medium according to claim 16, wherein the dynamic wallpaper further comprises: at least one frame of continuous image corresponding to an always on display (AOD) screen-off scenario and at least one frame of continuous image corresponding to a lock screen scenario; and a first frame of the at least one frame of continuous image corresponding to the lock screen scenario is a frame after a last frame of the at least one frame of continuous image corresponding to the AOD screen-off scenario; and wherein when the instructions are run on the electronic device, the electronic device is further enabled to perform the following actions:

before the displaying the at least one frame of continuous image corresponding to the first home screen scenario on the first screen in response to the operation of switching to the home screen scenario, successively displaying the at least one frame of continuous image corresponding to the AOD screen-off scenario and the at least one frame of continuous image corresponding to the lock screen scenario on the first screen in response to an operation of switching to the lock screen scenario.

18. The non-transitory computer-readable storage medium according to claim 16, wherein when the instructions are run on the electronic device, the electronic device is further enabled to perform the following actions:

after the displaying the another at least one frame of continuous image of the dynamic wallpaper on the second screen, when it is detected that the hinge angle is reduced, displaying the at least one frame of continuous image corresponding to the second home screen scenario on the second screen based on the hinge angle in a reverse sequence of an image arrangement sequence, until the first screen is switched to for displaying the user interface, and then displaying the last frame of image corresponding to the first home screen scenario on the first screen.

19. The non-transitory computer-readable storage medium according to claim 16, wherein the dynamic wallpaper further comprises: at least one frame of continuous image corresponding to an always on display (AOD) screen-off scenario and at least one frame of continuous image corresponding to a lock screen scenario; and the first frame of the at least one frame of continuous image corresponding to the lock screen scenario is a frame after a last frame of the at least one frame of continuous image corresponding to the AOD screen-off scenario;

wherein when the instructions are run on the electronic device, the electronic device is further enabled to perform the following actions:

after the displaying at least one frame of continuous image of the dynamic wallpaper on the second screen:

displaying an AOD screen-off interface that does not comprise an image of the dynamic wallpaper on the second screen; and successively displaying the at least one frame of continuous image corresponding to the AOD screen-off scenario and the at least one frame of continuous image corresponding to the lock screen scenario on the second screen in response to an operation of switching to the lock screen scenario;

wherein a first frame of the at least one frame of continuous image corresponding to the first home screen scenario is a frame after a last frame of the at least one frame of continuous image corresponding to the lock screen scenario; and wherein when the instructions are run on the electronic device, the electronic device is further enabled to perform the following actions:

after successively displaying the at least one frame of continuous image corresponding to the AOD screen-off scenario and the at least one frame of continuous image corresponding to the lock screen scenario on the second screen in response to the operation of switching to the lock screen scenario, successively displaying the at least one frame of continuous image corresponding to the first home screen scenario and the at least one frame of continuous image corresponding to the second home screen scenario on the second screen in response to an operation of switching to a home screen scenario.

\* \* \* \* \*